(12) United States Patent
Akahori

(10) Patent No.: US 7,202,873 B2
(45) Date of Patent: Apr. 10, 2007

(54) SPECIFIC SCENE IMAGE SELECTING APPARATUS, COMPUTER PROGRAM AND COMPUTER READABLE MEDIUM ON WHICH THE COMPUTER PROGRAM IS RECORDED

(75) Inventor: Sadato Akahori, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 214 days.

(21) Appl. No.: 10/949,202

(22) Filed: Sep. 27, 2004

(65) Prior Publication Data

US 2005/0069278 A1 Mar. 31, 2005

(30) Foreign Application Priority Data

Sep. 25, 2003 (JP) ............... 2003-333411
Sep. 24, 2004 (JP) ............... 2004-277577

(51) Int. Cl.
*G06T 15/00* (2006.01)

(52) U.S. Cl. .................. 345/589; 382/304; 712/10

(58) Field of Classification Search ............. 345/589, 345/505–506; 382/304; 712/10; 386/4
See application file for complete search history.

(56) References Cited

U.S. PATENT DOCUMENTS

| | | | |
|---|---|---|---|
| 5,438,682 A | | 8/1995 | Kumagai .................. 345/505 |
| 5,557,688 A | * | 9/1996 | Nakamura ................. 382/164 |
| 6,542,632 B1 | * | 4/2003 | Qian et al. ................. 382/165 |
| 6,983,068 B2 | * | 1/2006 | Prabhakar et al. .......... 382/162 |
| 6,985,628 B2 | * | 1/2006 | Fan .......................... 382/224 |
| 7,062,084 B2 | * | 6/2006 | Messing et al. ............ 382/165 |
| 2002/0097441 A1 | | 7/2002 | Hara et al. ................. 358/302 |

FOREIGN PATENT DOCUMENTS

EP 0 942 380 A2 9/1999
JP 11-298736 A 10/1999

OTHER PUBLICATIONS

Japanese Abstract No. 2000101905, dated Apr. 7, 2000.

* cited by examiner

*Primary Examiner*—Phu K. Nguyen
(74) *Attorney, Agent, or Firm*—Sughrue Mion, PLLC

(57) ABSTRACT

An image selecting apparatus includes a designation receiving portion which receives designation of a desired specific scene, an input receiving portion which receives input of image data representing an object image, a characteristic value deriving portion which derives from the image data input into the input receiving portion a characteristic value for use in distinguishment of the specific scene referring to reference data in which the kind of a characteristic value and distinguishing condition corresponding to the characteristic value are defined in advance by the scenes which can be designated as the specific scene, and a distinguishing portion which determines whether the image data represents an image which is of the specific scene input into the designation receiving portion on the basis of the characteristic value derived by the characteristic value deriving portion referring to the corresponding distinguishing condition defined in the reference data.

14 Claims, 21 Drawing Sheets

FIG.2

REFERENCE DATA

| SCENE | KIND OF CHARACTERISTIC VALUE | DISTINGUISHING CONDITION |
|---|---|---|
| UNDERWATER | MEAN OF DENSITIES B | -2.1, -2.2, · · · · · -2.0, 2.6 |
| | 80%POINT–20%POINT OF DENSITY B | 2.5, 2.3, · · · · · -2.0, -2.3 |
| | 70% POINT OF COLOR DIFFERENCE Cb | -1.8, -1.9, · · · · · -2.5, 2.8 |
| EVENING GLOW | 70% POINT OF DENSITY R | -2.5, -3.2, · · · · · 3.1, 3.0 |
| | 90% POINT OF BRIGHTNESS Y | -2.0, -2.5, · · · · · 2.8, 3.0 |
| | 90% POINT OF DENSITY R | -1.8, -1.8, · · · · · 2.0, 1.9 |
| | MEAN OF COLOR DIFFERENCE Cr | -1.5, -1.3, · · · · · 1.5, 1.6 |
| NIGHT | MEAN OF BRIGHTNESS Y | 3.0, 3.1, · · · · · -2.8, -2.8 |
| | COLOR SATURATION 60% POINT | 2.8, 3.0, · · · · · -3.0, -2.9 |
| | 70%POINT–30%POINT OF COLOR SATURATION | 2.8, 2.5, · · · · · -1.9, -2.3 |
| | MEAN OF DENSITIES B | -1.5, -1.2, · · · · · 0.9, 1.0 |

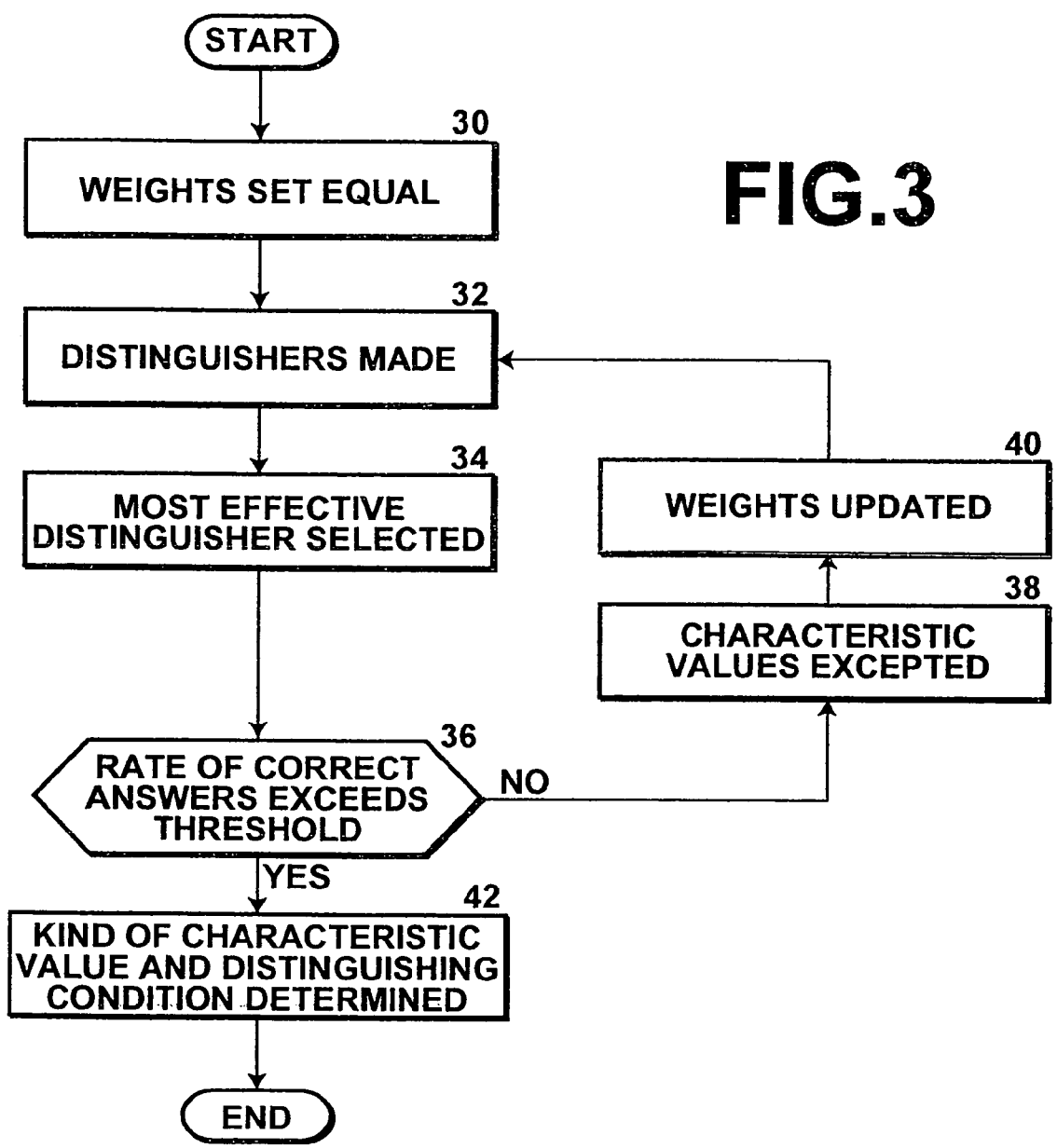

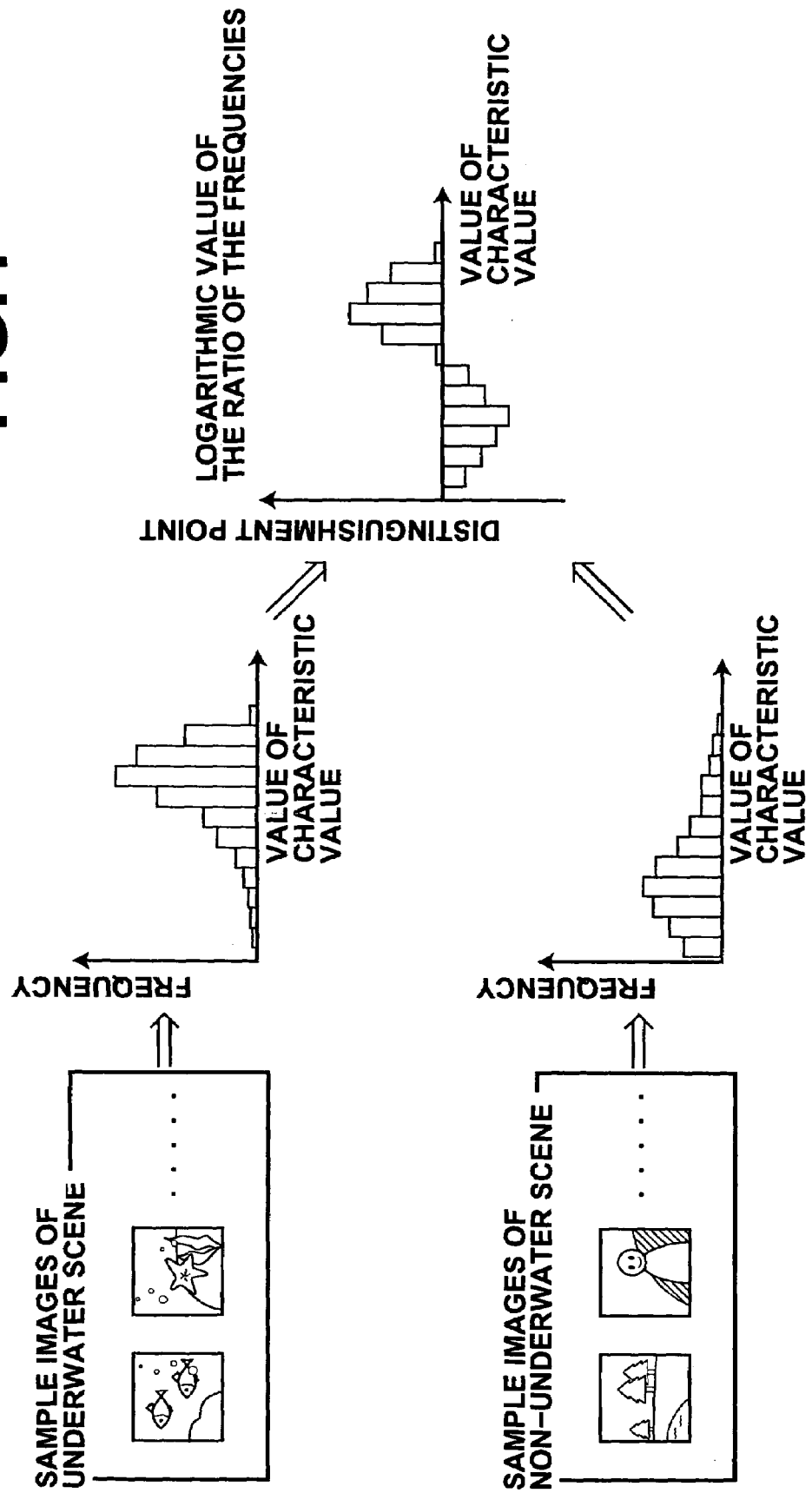

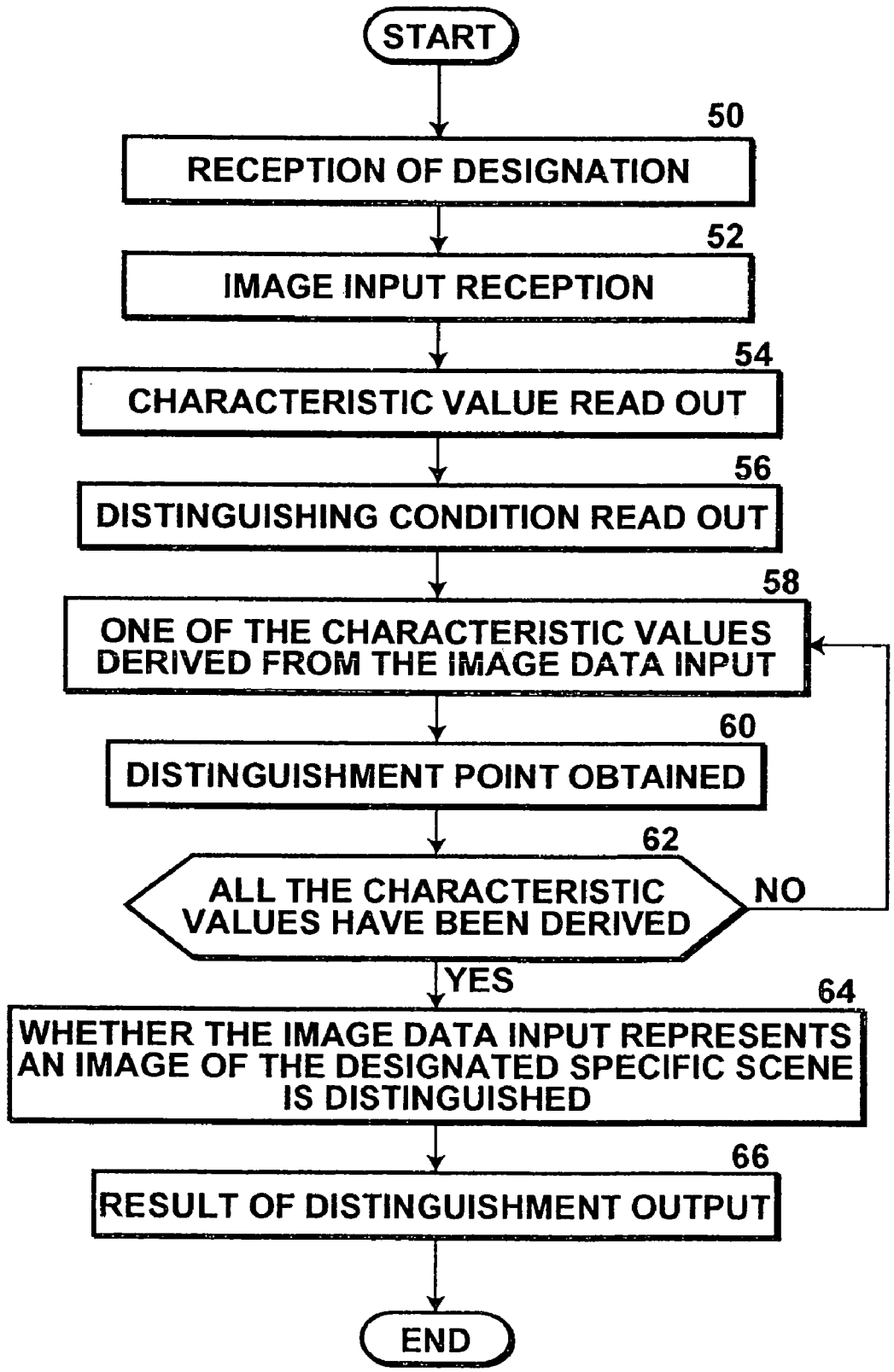

FIG.8

EXECUTING ENVIRONMENT-COMPUTING AMOUNT DATA

| PERFORMANCE OF CPU | LIMIT OF AMOUNT OF OPERATION |
|---|---|
| A | 120 |
| B | 100 |
| C | 80 |

FIG.9

CHARACTERISTIC VALUE-COMPUTING AMOUNT DATA

| KIND OF CHARACTERISTIC VALUE | COMPUTING AMOUNT POINT |
|---|---|
| MEAN OF DENSITIES R | 10 |
| 90%POINT-10%POINT OF DENSITY R | 15 |
| ⋮ | ⋮ |
| MEAN OF BRIGHTNESS Y | 15 |
| 90%POINT-10%POINT OF BRIGHTNESS Y | 20 |
| ⋮ | ⋮ |
| MEAN EDGE STRENGTH | 30 |
| 90%POINT-10%POINT OF EDGE STRENGTH | 35 |
| ⋮ | ⋮ |

FIG.10  REFERENCE DATA

PERFORMANCE OF CPU : A(HIGH)

| SCENE | KIND OF CHARACTERISTIC VALUE | DISTINGUISHING CONDITION |
|---|---|---|
| UNDERWATER | MEAN OF DENSITIES B | -2.1 · · · 2.6 |
| | 80%POINT-20%POINT OF DENSITY B | 2.5 · · · -2.3 |
| | 70% POINT OF COLOR DIFFERENCE Cb | -1.8 · · · 2.8 |
| | 70% POINT-30%POINT OF COLOR SATURATION | 2.0 · · · -1.8 |
| | MEAN EDGE STRENGTH | 1.2 · · · -0.8 |
| EVENING GLOW | ⋮ | ⋮ |
| NIGHT | ⋮ | ⋮ |

PERFORMANCE OF CPU : B(INTERMEDIATE)

| SCENE | KIND OF CHARACTERISTIC VALUE | DISTINGUISHING CONDITION |
|---|---|---|
| UNDERWATER | MEAN OF DENSITIES B | -2.1 · · · 2.6 |
| | 80%POINT-20%POINT OF DENSITY B | 2.5 · · · -2.3 |
| | 70% POINT OF COLOR DIFFERENCE Cb | -1.8 · · · 2.8 |
| | 70% POINT-30%POINT OF COLOR SATURATION | 2.0 · · · -1.8 |
| EVENING GLOW | ⋮ | ⋮ |
| NIGHT | ⋮ | ⋮ |

PERFORMANCE OF CPU : C(LOW)

| SCENE | KIND OF CHARACTERISTIC VALUE | DISTINGUISHING CONDITION |
|---|---|---|
| UNDERWATER | MEAN OF DENSITIES B | -2.1 · · · 2.6 |
| | 80%POINT-20%POINT OF DENSITY B | 2.5 · · · -2.3 |
| | 70% POINT OF COLOR DIFFERENCE Cb | -1.8 · · · 2.8 |
| EVENING GLOW | ⋮ | ⋮ |
| NIGHT | ⋮ | ⋮ |

FIG.11

| SET BY USER | LIMIT OF COMPUTATIONAL AMOUNT POINT |
|---|---|
| HIGH QUALITY MODE | 100 |
| NORMAL MODE | 80 |

FIG.12

HIGH QUALITY MODE

| SCENE | CHARACTERISTIC VALUE ID | DISTINGUISHING CONDITION |
|---|---|---|
| NIGHT: | 1 | 1.3, 1.0, ··· |
| | 23 | 1.7, 1.8, ··· |
| | ... | ... |
| | 10 | −2.1, 0.1, ··· |
| EVENING GLOW: | ··· | |
| ··· : | ··· | |

NORMAL MODE

| SCENE | CHARACTERISTIC VALUE ID | DISTINGUISHING CONDITION |
|---|---|---|
| NIGHT: | ··· | ··· |
| EVENING GLOW: | ··· | |
| ··· : | ··· | |

SPECIFIC SCENE IMAGE SELECTING APPARATUS, COMPUTER PROGRAM AND COMPUTER READABLE MEDIUM ON WHICH THE COMPUTER PROGRAM IS RECORDED

BACKGROUND OF THE INVENTION

1. Field of the Invention

This invention relates to a specific scene image selecting apparatus, a computer program for causing a computer to function as the apparatus, and a computer readable medium on which the computer program is recorded, and more particularly to a specific scene image selecting apparatus for selecting an image of a specific scene out of images of various scenes represented by digital image data in order to classify the images by the scenes, a computer program for causing a computer to function as the apparatus, and a computer readable medium on which the computer program is recorded.

2. Description of the Related Art

Recently, there has been investigated a procedure for selecting an image of a specific scene out of images of various scenes represented by digital image data in order to classify the images by the scenes or print or correct the images by the scenes.

For example, in U.S. Patent Laid-Open No. 20020097441, there has been disclosed a procedure for distinguishing which an image taken by a digital camera is to be classified, a portrait, an evening scene, or a night scene by the use of information on whether there appears a person and information on histograms of colors as common indexes.

Further, there have been proposed various procedures for a specific scene. For example, as a procedure for distinguishing whether the scene is a scene of the evening glow, there has been proposed in Japanese Unexamined Patent Publication No. 11(1999)-298736, where histograms of the products of chroma and hue and the products of hue and brightness of pixels which are determined to be red to yellow on the basis of the pixel data thereof are made and when the dispersion of the histograms of an object image is larger than a predetermined reference value, the object image is determined to be of a scene of the evening glow.

However, the users can designate various scenes as the specific scene and the object images can be various. Accordingly, there has been a problem that an attempt to distinguish a plurality of specific scenes by the use of a common index at a high accuracy is difficult to realize. Though it may be possible to improve the accuracy of distinguishment by increasing the number of the indexes, this approach significantly increases the amount of operation and adds to the time and cost required to distinguish a specific scene. Further when the number of the indexes is increased, the index which is not so useful to distinguish a desired specific scene is also calculated each time an image is supplied, whereby wasteful operations must be run.

Further, it is conceivable that distinguishing algorisms are set specifically to individual specific scenes which can be designated by the users and various scenes are distinguished by the use of apparatuses loaded with the algorisms or a program of a combination of the distinguishing algorisms. With this arrangement, the respective scenes can be distinguished at a high accuracy with waste operations avoided. However, such an approach is disadvantageous in that many works are necessary to set and load the distinguishing algorisms, which significantly adds to the time and the cost required to develop the apparatus and/or the programs. Further, change of the reference on the basis of which the scenes are distinguished requires a lots of time and cost as well as addition of the specific scene.

SUMMARY OF THE INVENTION

In view of the foregoing observations and description, the primary object of the present invention is to provide a specific scene image selecting apparatus which can select an image of various specific scenes at a high accuracy and which can reduce the load of operation and the effort of development, a computer program for causing a computer to function as the apparatus, and a computer readable medium on which the computer program is recorded.

In accordance with an aspect of the present invention, there is provided a specific scene image selecting apparatus comprising a scene designation receiving means which receives designation of a desired specific scene, an image input receiving means which receives input of image data representing an object image to be selected, a characteristic value deriving means which derives from the image data input into the image input receiving means at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and a distinguishing means which determines whether the image data is data representing an image which is of the specific scene input into the scene designation receiving means on the basis of the characteristic value derived by the characteristic value deriving means referring to the corresponding distinguishing condition defined in the reference data.

In this invention, the term "characteristic value" means a parameter representing a characteristic of the image. The characteristic value may represent any one of the characteristic of the image such as color of the image, brightness of the image, texture of the image, information on depth of the image, characteristics of the edges included in the image and the like. The characteristic value may be a weighted sum of a plurality of indexes representing these characteristics.

Further, in this invention, the term "distinguishing condition" means a condition under which whether the image is of the specific scene is determined by the use of the characteristic value as an index.

In the specific scene image selecting apparatus of the present invention, the reference data may be determined by learning for each of the scenes which can be designated as the specific scene in advance a weighted sample image group consisting of a plurality of images which have been known to be of the scene and a plurality of images which have been known not to be of the scene and the learning of the plurality of scenes may comprise the setting step of setting equal to each other the initial values of the weights on the respective images forming the weighted sample image group, the selecting step of selecting a distinguisher, which is the most effective to distinguish scenes to be currently learned and scenes not to be currently learned, out of the distinguishers corresponding to the respective characteristic values which are used for distinguishment of the scenes, the updating step of updating the weights of the respective images of the weighted sample image group so that the weights of the images not correctly distinguished by the distinguisher which is selected by the preceding selecting step is larger than the current weights of the images and/or the weights of the images correctly distinguished by the distinguisher which is selected by the preceding selecting step is smaller than the current weights of the images, the repeating step of repeating the selecting step and the updating step until the rate of correct answers of the combination of the selected distinguishers exceeds a predetermined reference value, and the determining step of determining the kind of at least one characteristic value for use in distinguishment of the scene to be currently learned and the distinguishing condition on the basis of the selected distinguisher. In this case, the distinguishers corresponding to the respective characteristic values may comprise a histogram which represents the ratio or the difference between the respective frequencies of the characteristic value corresponding to the distinguisher which are exhibited by the images to be currently learned and those of the characteristic value corresponding to the distinguisher which are exhibited by the images not to be currently learned.

Here, the "distinguisher" provides a reference on the basis of which whether the image is of the specific scene is determined by the use of the characteristic value and forms a reference on the basis of which the distinguishing condition is determined.

Further, the selecting step described above is a step for selecting a distinguisher, which is the most effective to distinguish scenes to be currently learned and scenes not to be currently learned taking into account also the weight on each of the sample images. That is, when the weights on the respective images are equal to each other, the distinguisher which is most effective is simply the distinguisher the number of the sample images correctly distinguished on the basis of which is the largest. However, when the weights on the respective images are different from each other, an importance is given to that images of larger weights are correctly distinguished.

Further the term "the rate of correct answers of the combination of the selected distinguishers" means the rate at which the result of distinguishment whether the respective sample images are of the scene to be currently learned by the use of combinations of the distinguishers which have been selected actually conforms to the answers to whether the respective sample images are of the scene to be currently learned, and when the rate of correct answers exceeds the predetermined reference value by one selecting step and one updating step, the repeating step is not carried out.

The histogram which represents the ratio or the difference may be a histogram which directly represents the ratio or the difference between the frequencies or may be a histogram which represents the logarithmic value or the like of the ratio or the difference between the frequencies.

The specific scene image selecting apparatus of this invention described above may further comprise a correct answer receiving means which receives correct designation of a scene which the image data of an image which has not been correctly distinguished by the distinguisher indicates, and an additional learning means which updates the reference data by learning the image data of the scene the correct designation of which has been received.

The image taking device comprises
an image taking means which obtains image data representing an object taken,
a scene designation receiving means which receives designation of a desired specific scene,
a characteristic value deriving means which derives from the image data at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and
a distinguishing means which determines whether the image data is data representing an image which is of the specific scene input into the scene designation receiving means on the basis of the characteristic value derived by the characteristic value deriving means referring to the corresponding distinguishing condition defined in the reference data.

The image taking device may further comprise a scene specifying information obtaining means which obtains information for specifying the scene upon taking the image, and
the scene designation receiving means may receive designation of a desired specific scene on the basis of the information for specifying the scene obtained by the scene specifying information obtaining means.

The information for specifying the scene is, for instance, information such as the photographing time which can be referred in distinguishment of a specific scene, e.g., in distinguishing whether the image can be of a night scene.

In accordance with another aspect of the present invention, there is provided a computer program for causing a computer to function as a scene designation receiving means which receives designation of a desired specific scene, as an image input receiving means which receives input of image data representing an object image to be selected, as a characteristic value deriving means which derives from the image data input into the image input receiving means at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and as a distinguishing means which determines whether the image data is data representing an image which is of the specific image input into the scene designation receiving means on the basis of the characteristic value derived by the characteristic value deriving means referring to the corresponding distinguishing condition defined in the reference data. Further, in accordance with still another aspect of the present invention, there is provided a computer readable medium on which the computer program is recorded.

In the computer program and the computer readable medium of the present invention, the kinds and/or the number of the characteristic values may be changed depending on the operating power of the program executing environment and/or the desired processing speed.

In accordance with still another aspect of the present invention, there is provided a specific scene image selecting method comprising
a scene designation receiving step of receiving designation of a desired specific scene,
an image input receiving step of receiving input of image data representing an object image to be selected,
a characteristic value deriving step of deriving from the image data at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and a distinguishing step of determining whether the image data is data representing an image which is of the specific scene designated in the scene designation receiving step on the basis of the characteristic value derived in the characteristic value deriving step referring to the corresponding distinguishing condition defined in the reference data.

In the specific scene image selecting apparatus for selecting an image of a specific scene out of images of various scenes, the computer program for causing a computer to function as the apparatus, and the computer readable medium on which the computer program is recorded in accordance with the present invention, since the reference data in which the kind of the characteristic value to be used and the distinguishing condition are defined by the specific scenes is used, the algorism itself may be unchanged irrespective of the specific scene and the images can be classified by an accurate distinguishment which is suitable for each of the respective specific scenes without substantially adding to the cost. Further, since the kinds and/or the number of the characteristic values may be changed from one specific scene to another, the kinds and/or the number of the characteristic values optimal to the specific scene may be used and images can be selected at a high accuracy without need of running wasteful operations. Further, change of the distinguishing condition and/or addition of the specific scenes can be easily effected by simply changing the reference data without correcting the distinguishing algorism and/or adding or loading the corrected algorism.

When the reference data is determined by learning the weighted sample image group by repeating the selecting step and the updating step, a selection which is more accurate and less in oversight can be carried out over various images since an importance is given to the sample images which have not been correctly distinguished by the previously selected distinguishers and additional distinguishers which can correctly distinguish such sample images are selected in sequence and the kind of the characteristic value to be used in distinguishment and the distinguishing condition corresponding thereto are determined.

When a correct designation of a scene which the image data of an image which has not been correctly distinguished by the distinguisher indicates is received, and updating of the reference data by learning the image data of the scene the correct designation of which has been received is possible, accuracy of selection can be continuously improved in accordance with the actual object image to be selected. Further, since the contents of the reference data of the specific scenes which the user frequently designate become especially better, such specific scenes can be selected at an especially high accuracy.

When the image taking device has a function of distinguishing the image, an image processing suitable for each image taken by the device can be carried out.

Further, by obtaining information for specifying the scene by the image taking device, the distinguishing accuracy can be increased.

Further, when the kinds and/or the number of the characteristic values derived from the image data of the object image can be changed depending on the operating power of the program executing environment and/or the desired processing speed in the computer program and the computer readable medium of the present invention, the highest distinguishing accuracy can be realized due to optimal load within the operating power of the program executing environment and/or the desired processing speed.

BRIEF DESCRIPTION OF THE DRAWINGS

FIG. 2 shows an example of the reference data employed in the apparatus shown in FIG. 1, FIG. 3 is a flow chart illustrating the flow of the learning procedure for defining the reference data shown in FIG. 2, FIG. 4 is a view illustrating the method of deriving the distinguisher on the basis of which the distinguishing condition shown in FIG. 2 is determined, FIG. 5 is a flow chart for illustrating the operation of the apparatus shown in FIG. 1, FIG. 8 is a view showing an example of the program executing environment-computing amount data used in the processing shown in FIG. 7, FIG. 9 is a view showing an example of the characteristic value-computing amount data used in the processing shown in FIG. 7, FIG. 10 is a view showing an example of the reference data used in a modification of the third embodiment, FIG. 11 is a view showing an example of the limits of the computational amount points employed in the high quality mode and the normal mode, FIG. 12 is a view showing an example of the reference data for the high quality mode and that for the normal mode.

DESCRIPTION OF THE PREFERRED EMBODIMENTS

Figure 1:
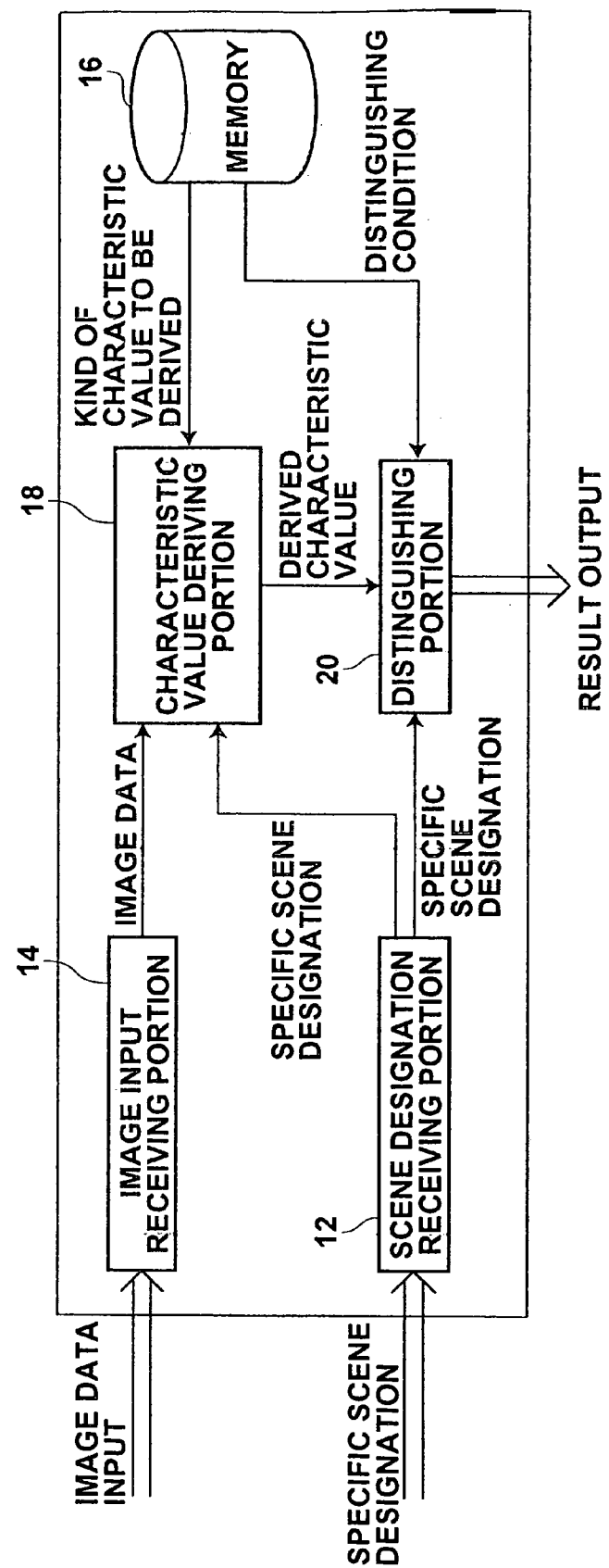
FIG. 1 is a block diagram showing a specific scene image selecting apparatus in accordance with a first embodiment of the present invention.

In FIGS. 1 to 5, a specific scene image selecting apparatus 10 comprises a scene designation receiving portion 12 which receives designation of the specific scene to be distinguished, an image input receiving portion 14 which receives input of object image data to be selected, a memory 16 in which reference data to be described later has been stored, a characteristic value deriving portion 18 which receives the inputs from the scene designation receiving portion 12 and the image input receiving portion 14 and derives a necessary characteristic value referring to the reference data in the memory 16, and a distinguishing portion 20 which determines whether the input image data is data representing an image of the designated specific scene on the basis of the characteristic value derived by the characteristic value deriving portion 18 and the reference data in the memory 16.

The reference data stored in the memory 16 defines, by the scenes which can be designated as the specific scene to be distinguished, the kind of the characteristic value for use in distinguishment of the scene and the distinguishing condition corresponding to the characteristic value, and may be, for instance, data in the form of a lookup table shown in FIG. 2. Though data for only underwater scenes, evening glow scenes, and night scenes are included for the purpose of explanation in the example shown in FIG. 2, the actual reference data generally includes data for much more scenes, and the kind and the number of the characteristic values for use in distinguishment differ from a scene to another. In the example shown in FIG. 2, "mean" is a mean of characteristic values (e.g., density of each color) which exists over the entire object image. Further, "n % point" (0<n<100) is a characteristic value which corresponds to a count of n % of all the pixels when individual characteristic values at pixels of the object image or a reduced image thereof are represented by a cumulative histogram. Further, "(m % point)−(n % point)" (0<m,n<100) means the difference between m % point and n % point. The kind of the characteristic value used need not be limited to those shown in the example of FIG. 2, but may be a maximum or minimum value of the characteristic value as well as the characteristic values according to information on edge strength, texture or depth of the image. The characteristic value may be a weighted sum of combinations of a plurality of characteristic values. The distinguishing condition corresponding to each characteristic value is expressed in a sequence which takes positive and negative values.

The kind of the characteristic value and the distinguishing condition shown in FIG. 2 are determined in advance by learning the sample image groups by the scenes. The learning of the sample image groups will be described hereinbelow with reference to the flow chart shown in FIG. 3 taking the learning of the underwater scenes for example.

The sample image group to be learned consists of a plurality of images which have been known to be of the underwater scene and a plurality of images which have been known not to be of the underwater scene. Each sample image is provided with a weight, that is, an importance, which differs from each other. The weights on all the sample images are initially set to be equal to each other. (step 30 in FIG. 3).

Then, in step 32, "distinguishers" are formed for all the characteristic values which can be used for the distinguishment. Each of the distinguishers provides a reference on the basis of which whether the image is of the scene is determined by the use of a characteristic value. In this example, a histogram for each characteristic value a method of derivation of which is illustrated in FIG. 4 is used as the distinguisher. When explained with reference to FIG. 4, a histogram for a characteristic value (e.g., mean of the density B (blue)) is first made at predetermined intervals for each of a plurality of images which have been known to be of the underwater scene. Similarly, a histogram for a characteristic value is first made at predetermined intervals for each of a plurality of images which have been known not to be of the underwater scene. Logarithmic values of the ratio of the frequencies of a characteristic values shown in the two histograms are expressed in the rightmost histogram shown in FIG. 4, and the histogram is sued as the distinguisher. The values along the ordinate of each histogram (distinguisher) will be referred to as the "distinguishment point", hereinbelow. In this distinguisher, an image whose characteristic value has a value corresponding to a positive distinguishment point has a larger probability that it is of the underwater scene, and the probability becomes larger as the absolute value of the distinguishment point increases. Whereas, an image whose characteristic value has a value corresponding to a negative distinguishment point has a larger probability that it is not of the underwater scene, and the probability becomes larger as the absolute value of the distinguishment point increases. In step 32, distinguishers in the form of histograms are formed for all the characteristic values which can be used for the distinguishment, e.g., respective means of the red, green, blue densities, mean brightness, respective means of color differences Cr and Cb, respective means of color saturation and hue, several n % points and/or several values of (m % point)−(n % point).

In the following step 34, a distinguisher which is the most effective in the distinguishers made in step 32 is selected. This is done taking into account the weights on the sample images. In this example, the rates of correct answer with a weight of the respective distinguishers are compared with each other, and the distinguisher which is the highest in the rate of correct answers with a weight is selected. That is, since the weights on the respective sample images are initially equal to each other, the distinguisher which is the most effective is simply the distinguisher the number of the sample images correctly distinguished whether they are of the underwater scene on the basis of which is the largest when step 34 is first executed. Whereas, when step 34 is executed after step 40 to be described later where update of the weights on the respective sample images occurs, e.g., a sample image A the weight on which is double of that on another sample image B is counted as double of the sample image B in evaluation of the rate of correct answers. With this, in the second and following steps 34, an importance is given to correctly distinguish the sample images of larger weights.

In the following step 36, it is determined whether the rate of correct answers of the combination of the distinguishers which have been selected, that is, the distinguishers which have been selected are used in combination and the rate at which the image samples correctly distinguished whether they are of an underwater scene by the combination of the distinguishers conforms to the actuality, which has been known, exceeds a predetermined threshold. Either of the sample image group whose sample images are equally weighted or the sample image group whose sample images are currently weighted may be used in evaluation of the rate of correct answers. When the rate of correct answers exceeds a predetermined threshold, it may be considered that the images of an underwater scene can be distinguished at a sufficiently high probability by the use of the distinguishers which have been selected, and accordingly, the learning is ended. Whereas, when the rate of correct answers does not exceed a predetermined threshold, the processing proceeds to step 38 in order to select an additional distinguisher to be used in combination of the distinguishers which have been selected.

In step 38, the characteristic values corresponding to the distinguishers which have been selected in the preceding step 34 are excepted in order not to select again such distinguishers.

In the following step 40, the weight on the sample image which whether the image is of the underwater scene cannot have been correctly distinguished by the distinguishers selected in the preceding step 34 is updated to be larger than the current weight thereon. On the other hand, the weight on the sample image which whether the image is of the underwater scene can have been correctly distinguished by the distinguishers selected in the preceding step 34 is updated to be smaller than the current weight thereon. This update of the weight is carries out in order to give an importance to images which have not been correctly distinguished by the distinguishers which have been selected so that distinguishers which can have been correctly distinguish such images are selected and the effect of combination of the distinguishers is enhanced. Further, since it is sufficient that the weight on the sample image which whether the image is of the underwater scene cannot have been correctly distinguished changes relatively to the weight on the sample image which whether the image is of the underwater scene can have been correctly distinguished, it is sufficient to effect one of the update to have the weight larger than the current weight thereon and the update to have the weight smaller than the current weight thereon.

Then the processing shown in FIG. 3 returns to step 32, and distinguishers are reformed for each of the characteristic values other than those which are excepted in step 38. Formations of the distinguisher in the second and following steps 32 are effected taking into account the weight on the sample image. For example, when the weight on a sample image A is double of the weight on another sample image B, frequencies double that of the image B is given to the image A in formation of the histogram on the basis of which the histogram shown at the center of FIG. 4 is made. In order to reduce the amount of operation a new distinguisher may be made in the form of updating the distinguisher made in the preceding step 32. Then in step 34, second most effective distinguisher is selected on the basis of the rate of correct answer with a weight of the respective distinguishers.

If the rates of correct answer exceeds a predetermined threshold in step 36 when distinguishers corresponding to three characteristic values of mean of densities B, the value of (the 80% point)–(20% point) of density B, and the value of 70% point of color difference Cb are selected while repeating steps 32 to 40 described above, the kind of the characteristic values and the distinguishing condition used for distinguishment of the underwater scene are determined as shown in the uppermost three lines in the reference data of FIG. 2. The distinguishing condition in the form of a sequence is shown in order from that corresponding to the value of a smallest characteristic value.

When the method of learning described above is employed, the distinguisher may be any so long as it provides a reference on the basis of which whether the image is of the specific scene is determined by the use of a characteristic value, and may be, for instance, binary data, a threshold value or a function. Further, the distinguisher may be a histogram which represents a distribution of the difference between two histograms shown at the center of FIG. 4.

Though in the example described above, each time the most effective distinguisher is selected, distinguishers are reformed taking into account the weight on the sample images in step 32 before the second most effective distinguisher is selected, effective distinguishers may be selected in order, out of the distinguishers initially made, on the basis of the rates of correct answer with a weight of the respective distinguishers by returning the processing shown in FIG. 3 from step 40 to step 34. As described above with reference FIG. 3, in the embodiment where distinguishers are reformed taking into account the weight on the sample images each time the most effective distinguisher is selected, the selection of the most effective distinguisher in step 34 may be effected not on the basis of the rates of correct answer with a weight but on the basis of the simple rates of correct answer. Since the distribution regions of the two histograms before obtaining the histogram of the ratio of the logarithmic values shown in FIG. 4 are clearly divided and the distinguisher which is larger in the sum of the absolute values of the distinguishment points is more suitable for distinguishment of images of the underwater scene, the distinguisher which is a maximum in the absolute value may be selected. Further, since the distinguishers become different when the weights on the sample images are updated in order to reform the distinguishers, step 38 where the characteristic values corresponding to the distinguishers which have been selected are excepted may be eliminated.

A suitable evaluation function may be employed in the selection of the most effective distinguisher.

Again referring to FIG. 1, the characteristic value deriving portion 18 can derive all the characteristic values for use in distinguishment of the scenes. That is, in this particular embodiment, the characteristic value deriving portion 18 can derive at least all the characteristic values included in the reference data shown in FIG. 2.

The operation of the specific scene image selecting apparatus 10 of the first embodiment will be described with reference to the flow chart shown in FIG. 5, hereinbelow.

Designation of a specific scene desired by the user out of the specific scenes, the underwater scene, the evening glow scene, and the night scene is first received by the scene designation receiving portion 12. (step 50).

Then in step 52, the image input receiving portion 14 receives input of image data representing an image to be selected. The image input receiving portion 14 may continuously receive a series of pieces of image data representing a plurality of images. Each image data to be received is, for instance, data representing the densities R, G, B for each pixels of the image.

Then in the following step 54, the characteristic value deriving portion 18 reads out from the memory 16 the kind of the characteristic value to be derived. For example, if the specific scene designated in step 50 is the underwater scene, the characteristic value deriving portion 18 refers to the reference data shown in FIG. 2 in the memory 16 and recognizes that mean of densities B, the value of the (80% point)–(20% point) of density B, and the value of 70% point of color difference Cb should be read out as the characteristic values.

Then in step 56, the distinguishing portion 20 reads out from the memory 16 the distinguishing conditions. In the above example where the underwater scene is designated, the distinguishing portion 20 reads out from the reference data shown in FIG. 2 in the memory 16 the distinguishing conditions on the three characteristic values described above.

In the following step 58, the characteristic value deriving portion 18 derives one characteristic value used for distinguishment of the designated specific scene from the image data input in step 52. In the above example where the underwater scene is designated, the characteristic value deriving portion 18 derives one of the three characteristic values described above from the image data input.

In step 60, the distinguishing portion 20 obtains one distinguishment point by referring the distinguishing condition on the basis of the characteristic value derived in step 58. Since the distinguishing conditions in FIG. 2 are distinguishment points of the data points corresponding to the characteristic values at regular intervals as described above, the distinguishment point obtained in step 60 is, for instance, a distinguishment point of a data point having a value closest to the characteristic value derived from the image data or a distinguishment point between data points the values of which are determined by linear interpolation.

In step 62, it is determined whether all the characteristic values to be derived have been derived. In the above example where the underwater scene is designated, it is determined whether the three characteristic values, mean of densities B, the value of the (80% point)–(20% point) of density B, and the value of 70% point of color difference Cb have been all derived and steps 58 to 62 are repeated until the three characteristic values have been derived and corresponding distinguishment points have been obtained.

After all the characteristic values to be derived have been derived and the corresponding distinguishment points have been obtained, the processing shown in FIG. 5 proceeds to step 64, and the distinguishing portion 20 distinguishes whether the image data input represents an image of the designated specific scene on the basis of all the obtained distinguishment points. In this embodiment, all the values of the distinguishment points are added and the distinguishment is effected on the basis of whether the sum is positive or negative. For example, in the above example where the underwater scene is designated, it is determined that the image data input represents an image of the designated specific scene when the sum of the values of distinguishment points about the three characteristic values, mean of densities B, the value of the (80% point)–(20% point) of density B, and the value of 70% point of color difference Cb derived from the input image data is positive whereas it is determined that the image data input does not represent an image of the designated specific scene when the sum of the values of the distinguishment points about the three characteristic values is negative.

Finally in step 66, the distinguishing portion 20 outputs the result of distinguishment, and then the processing shown in FIG. 5 is ended.

Though in the above embodiment, the reference data is stored in the memory 16 in the apparatus 10, the reference data may be stored in a medium separate from the apparatus 10 such as a CD-ROM so long as the characteristic value deriving means 18 and/or the distinguishing portion 20 can access to the reference data.

Further, the reference date for use in distinguishment need not be limited to that shown in Figure but may be any so long as it defines the kind of at least one characteristic value for use in distinguishment of the specific scene and the distinguishing condition corresponding thereto by the scenes which can be designated as the specific scene. For example, binary data, a single threshold value or a function may be used in place of the distinguishing condition shown in FIG. 2. In this case, the distinguishment by the distinguishing portion 20 is not always effected on the basis of whether the sum of the distinguishment points is positive or negative.

Further, learning for determining in advance the reference data need not be limited to that as described with reference to FIGS. 3 and 4. For example, a common mechanical learning known under the name of "clustering" or "boosting" may be used. Or the reference data may be empirically determined by a skilled engineer.

Further, though, in the embodiment described above, the image data input into the image input receiving portion 14 comprises, for instance, data representing densities R, G and B of each of the pixels making up the object image, and the characteristic value deriving portion 18 derives a characteristic value by operation from the image data, the image data may be in the form of a characteristic value group consisting of a plurality of characteristic values and the characteristic value deriving portion 18 may simply select a characteristic value group which the reference data in the memory 16 designates and send it to the distinguishing portion 20.

In the apparatus 10 in accordance with the first embodiment of the present invention, since the reference data in which the kind of the characteristic value to be used and the distinguishing condition are defined by the specific scenes is used, the algorism itself for operating the scene designation receiving portion 12, the input receiving portion 14, the characteristic value deriving portion 18 and the distinguishing portion 20 may be unchanged irrespective of the desired specific scene and the images can be classified by an accurate distinguishment which is suitable for each of the respective specific scenes without substantially adding to the cost. Further, since the kinds and/or the number of the characteristic values may be changed from one specific scene to another, the kinds and/or the number of the characteristic values optimal to the specific scene may be used and images can be selected at a high accuracy without need of running wasteful operations. Further, change of the distinguishing condition and/or addition of the specific scenes can be easily effected by simply changing the reference data without correcting the complicated distinguishing algorism and/or adding or loading the corrected algorism.

The apparatus 10 in accordance with the first embodiment of the present invention has been described above. A computer program which causes a computer to function as the scene designation receiving portion 12, the input receiving portion 14, the characteristic value deriving portion 18 and the distinguishing portion 20 and to execute the processing as shown in FIG. 5 is included in the present invention. Further, a computer-readable medium on which such a computer program has been recorded is included in the present invention. In these cases, the reference data either may be contained in the computer program or the computer-readable medium or may be provided by an external apparatus or a separate medium.

Figure 6:
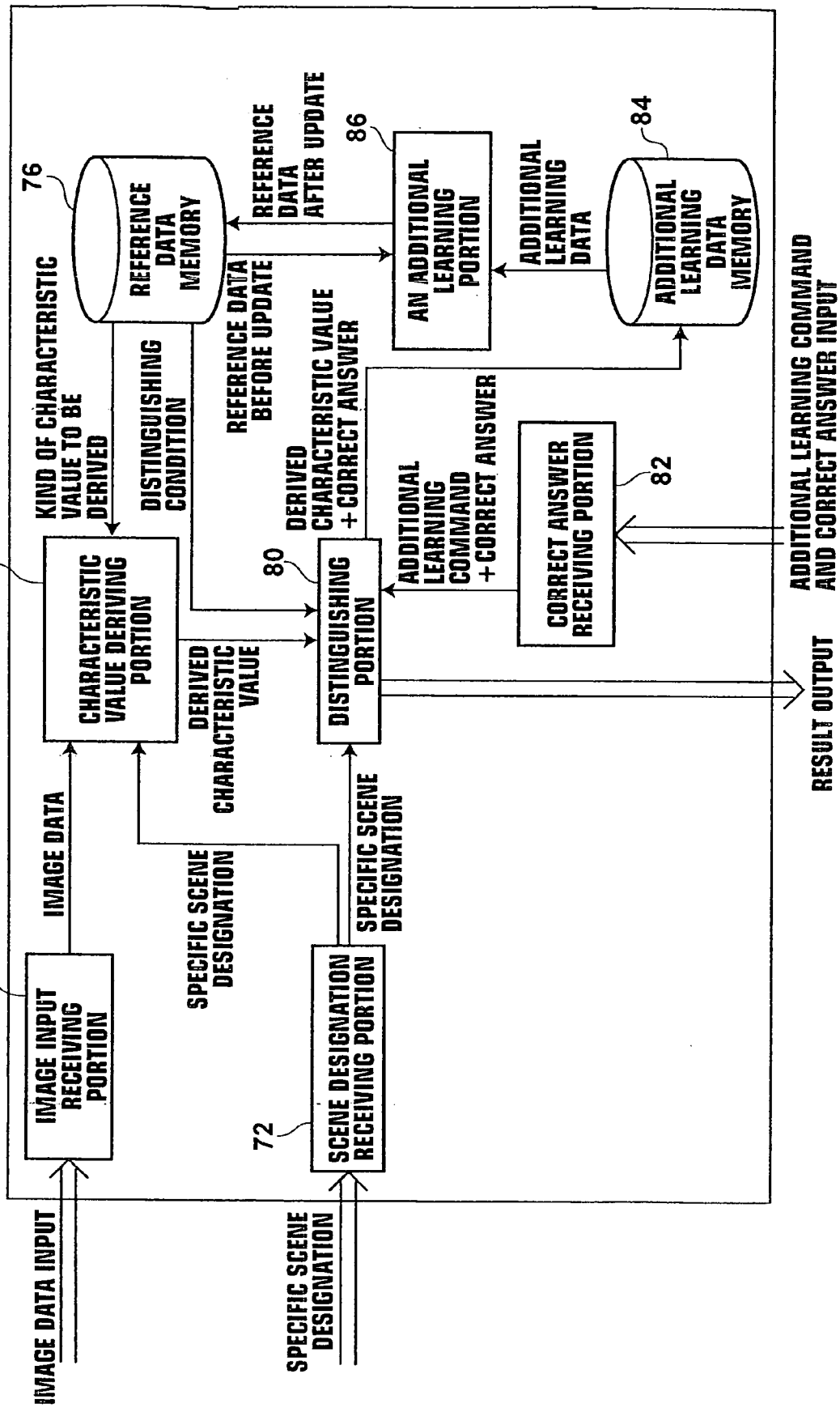
FIG. 6 is a block diagram showing a specific scene image selecting apparatus in accordance with a second embodiment of the present invention.

An apparatus in accordance with a second embodiment of the present invention will be described with reference to FIG. 6, hereinbelow. The scene designation receiving portion 72, the input receiving portion 74, the characteristic value deriving portion 78 and the distinguishing portion 80 in the apparatus 70 of the second embodiment are the same as the scene designation receiving portion 12, the input receiving portion 14, the characteristic value deriving portion 18 and the distinguishing portion 20 in the first embodiment. Accordingly, these elements will not be described here, and elements which. Accordingly, these elements will not be described here, and only elements which are absent in the first embodiment will be described, hereinbelow.

The apparatus 70 of the second embodiment is provided with a correct answer receiving portion 82, an additional learning data memory 84 and an additional learning portion 86 and has a self-learning function. When a user who receives the result of distinguishment from the distinguishing portion 80 checks the images which are selected or not selected by, for instance, displaying the images on a display and it is determined that the result of distinguishment is not correct, the user will want that similar images should be correctly selected at the next time. The apparatus 70 of this embodiment will meet such a requirement.

That is, when the user receives incorrect result of the distinguishment and wants to cause the apparatus 70 to learn it, the user can designate the correct scene for the image and issue an additional learning command to the correct answer receiving portion 82. For example, when the image which is distinguished as of the underwater scene by the distinguishing portion 80 is actually of the night scene, the user can designate the night scene and issue an additional learning command to the correct answer receiving portion 82. Upon receipt of the correct designation and the additional learning command, the correct answer receiving portion 82 transfers them to the distinguishing portion 80. In response to this, the distinguishing portion 80 sends each of the characteristic values derived by the characteristic value deriving portion 78 in distinguishment of the images determined to be incorrect in the result of distinguishment and the designated correct answer to the additional learning data memory 84. Or the distinguishing portion 80 may send the designated correct answer and the original image data to the additional learning data memory 84. In the additional learning data memory 84, the characteristic value or the image data of each sample image which are used in derivation of the initial reference data stored in the reference data memory 76 is also stored.

When the amount of data to be additionally learned in the additional learning data memory 84 exceeds a predetermined reference value after repeated use of the apparatus 70, the data stored in the are sent to the additional learning portion 86 and in the additional learning portion 86, the learning and updating of the reference data are effected again. In this particular embodiment, the additional learning portion 86 learns again, for instance, by the procedure shown in FIG. 3 all the images to be additionally learned where the correct answers are designated and the sample images used for deriving the initial reference data, thereby deriving new reference data.

Further, the procedure of the learning to be executed by the additional learning portion 86 need not be limited to that as described above. For example, a common mechanical learning known under the name of "clustering" or "boosting" may be used. The procedure of the learning need not be limited to that where the characteristic value or image data of each of the sample images which has been used in deriving the initial reference data is stored in the additional learning data memory 84. For example, only the images the correct answer for which is designated may be learned. In this case, for instance, a method where histograms such as described above with reference to FIG. 4 are created by the respective specific scenes and by the respective characteristic values for the data of the images to be learned, the weighted mean of the distinguishing conditions which the histograms exhibit and the distinguishing conditions which the reference data which have been stored in the reference data memory 76 is taken and the distinguishing conditions the weighted mean of which has been taken are used for updating the reference data in the reference data memory 76, may be employed. Further, it is possible to employ an arrangement where the data of the images to be additionally learned is directly sent to the additional learning portion 86 from the distinguishing portion 80 without providing the additional learning data memory 84 and the reference data is updated in sequence.

Though, in the embodiment described above, the additional learning and the update of the reference data occur when the amount of data to be additionally learned exceeds a predetermined reference value, the additional learning and the update of the reference data may be effected periodically or on demand from the user.

In accordance with the apparatus 70 of the second embodiment, there obtains an effect that the selecting accuracy can be continuously improved in addition to the effects obtained by the apparatus 10 of the first embodiment. Further, since the contents of the reference data gets better in the specific scenes which the user frequently designates, higher distinguishing accuracy can be realized.

The apparatus 70 in accordance with the second embodiment of the present invention has been described above. A computer program which causes a computer to function as the scene designation receiving portion 72, the input receiving portion 74, the characteristic value deriving portion 78 and the distinguishing portion 80 is included in the present invention. Further, a computer-readable medium on which such a computer program has been recorded is included in the present invention.

A computer program in accordance with a third embodiment of the present invention will be described with reference to FIGS. 7 to 10, hereinbelow. The computer program in accordance with the third embodiment of the present invention is for causing a computer to execute the processing of selecting images of the specific scenes described above in conjunction with the preceding embodiments under an optimal load taking into account the program executing environment such as the performance of the CPU or the capacity of the memory.

Figure 7:
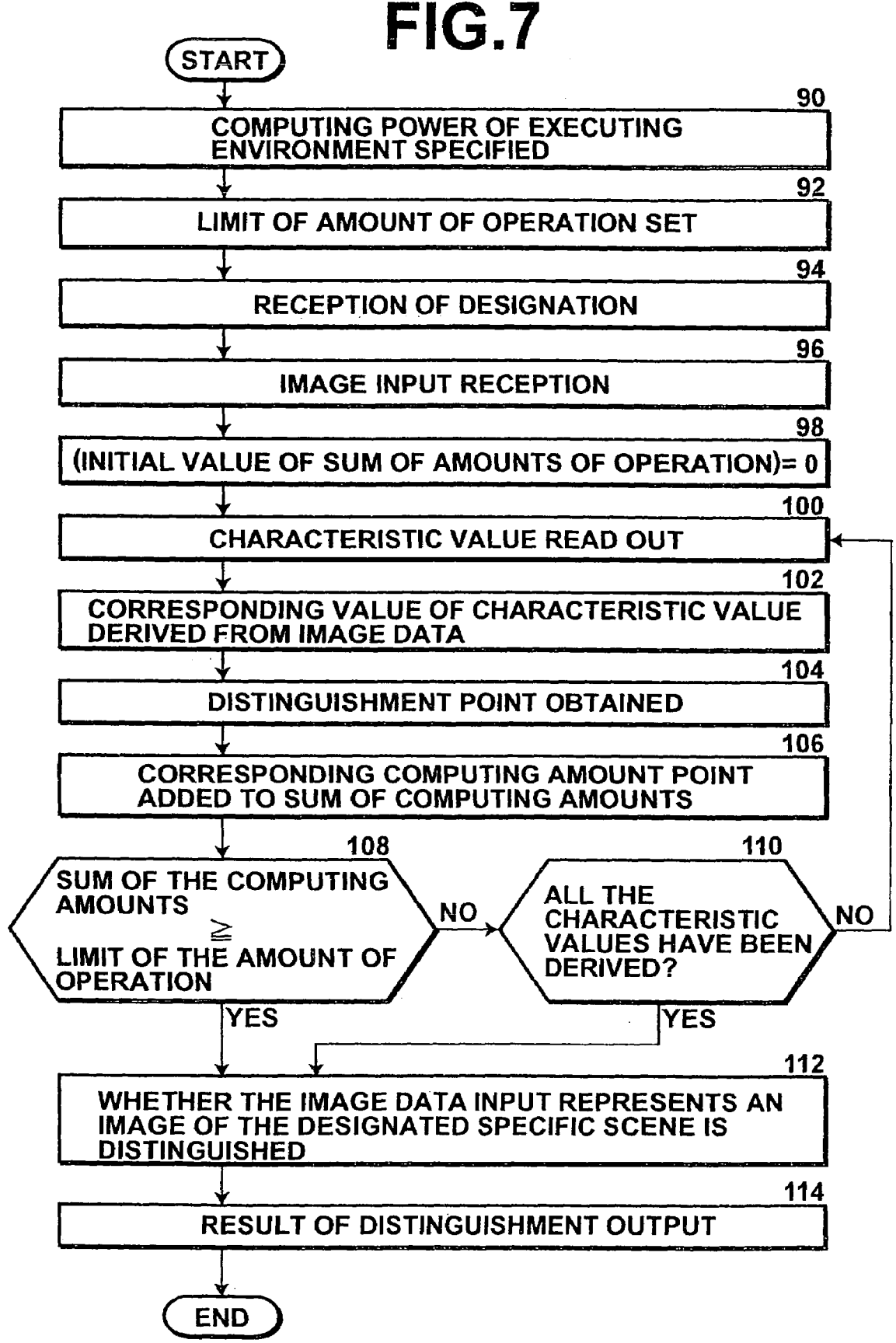
FIG. 7 is a view showing a flow chart illustrating the flow of processing which the computer program in accordance with a third embodiment of the present invention causes a computer to execute.

FIG. 7 is a flow chart illustrating the flow of processing which the computer program in accordance with a third embodiment of the present invention causes a computer to execute.

In step 90, the computing power of the executing environment is specified. In this embodiment, it is assumed that only the performance of the CPU of the computer to be used governs the computing power of the executing environment. In step 90, the kind of the CPU of the computer may be specified by automatically detecting the kind of the CPU of the computer to be used or by requiring the user to designate the model No. of the computer to be used.

Then in step 92, limit of the amount of operation is set referring to the executing environment-operation amount data on the basis of the performance of the CPU of the computer specified in step 90. In this embodiment, the executing environment-operation amount data is data in the form of a lookup table where the limit of the amount of operation is defined by the performance of the CPU as shown in FIG. 8. In the example shown in FIG. 8, the limit of the amount of operation is set higher as the performance of the CPU increases. The executing environment-operation amount data may be included in the program or may be provided from an external apparatus or a separate medium such as a CD-ROM.

In the following steps 94 and 96, designation of a specific scene desired and input of image data representing an image to be selected are received as in the processing shown in FIG. 5. The initial value of the sum of the amounts of operation is set to 0 in step 98.

In step 100, a set of the kind of the characteristic value and the distinguishing condition is read out from the reference data. The reference data is the same as the data shown in FIG. 2. For example when the specific scene designated in step 94 is the underwater scene, mean of densities B is read out out of the three kinds of characteristic values, i.e., mean of densities B, the value of the (80% point)–(20% point) of density B, and the value of 70% point of color difference Cb and the distinguishing condition corresponding thereto is read out. The reference data may be included in the program or may be provided from a memory in the computer, an external apparatus or a separate medium.

Then in step 102, the value of the characteristic value corresponding to those read out from the preceding step 100 is derived from the image data input in step 96. Here, the program in accordance with this embodiment defines operation necessary to derive at least all the characteristic values included in the reference data shown in FIG. 2.

In step 104, one distinguishment point is obtained by referring the distinguishing condition on the basis of the characteristic value derived in step 102. The processing here may be effected in a procedure the same as step 60 in FIG. 5.

In step 106, a computing amount point corresponding to the value of the characteristic value derived in step 102 is added to the sum of the computing amounts referring to characteristic value-computing amount data. In this embodiment, the characteristic value-computing amount data is data in the form of a lookup table where the computing amount point is defined by the values of the characteristic value used in distinguishment as shown in FIG. 9. A larger computing amount point is given to the characteristic value in the data as the characteristic value is larger in computing number of times or repeating number of times. For example, when the image data input in step 96 is data representing the values of the densities R, G and B of the pixels making up the object image, means of the densities R, G and B can be derived by relatively small number of times of computing, but the characteristic values about the edge strength, the texture, information of depth and the like require significantly larger number of times of computing. Accordingly, a larger computing amount point is given to the characteristic value about the edge strength or the like than the characteristic value about the means of densities. The characteristic value-computing amount data may be included in the program or may be provided from a memory in the computer, an external apparatus or a separate medium.

In step 108, it is determined whether the sum of the computing amounts becomes not smaller than the limit of the amount of operation set in step 92. When it is determined that the sum of the computing amounts is still smaller than the limit of the amount of operation, it is further determined in step 110 that all the characteristic values defined by the reference data for the current specific scenes have been derived. When it is determined in step 110 that all the characteristic values defined by the reference data for the current specific scenes have not been derived yet, the processing shown in FIG. 7 returns to step 100. Thus, steps 100 to 110 are repeated until all the characteristic values defined by the reference data for the current specific scenes have been derived.

When the sum of the computing amounts becomes not smaller than the limit of the amount of operation or all the characteristic values defined by the reference data for the current specific scenes have been derived, the processing shown in FIG. 7 proceeds to step 112. In step 112, whether the input image data is of the designated specific scene is determined on the basis of all the distinguishment points. As in the first embodiment, the distinguishment is effected by adding up all the values of the distinguishment points.

Finally in step 114, the result of distinguishment is output, and then the processing shown in FIG. 7 is ended.

Method carrying out the processing under an optimal load taking into account the program executing environment need not be limited to that described above. For example, reference data such as shown in FIG. 10 may be used in place of that such as shown in FIG. 2 without use of the executing environment-operation amount data nor the characteristic value-computing amount data. In the reference data shown in FIG. 10, data in the form of a lookup table similar to that shown in FIG. 2 is defined by the performance of the CPU. As the performance of the CPU becomes higher, the number of the characteristic values to be used in distinguishment of each of the specific scenes is increased, and as the performance of the CPU becomes lower, the number of the characteristic values to be used in distinguishment of each of the specific scenes is decreased, as can be understood from FIG. 10. In addition to or in place of this, characteristic values which requires a lot of computing such as the edge strength, the texture, information of depth and the like may be omitted in the lookup tables corresponding to the CPUs of the low performances. In the modification where reference data such as shown in FIG. 10, steps 92, 98, 106 and 108 shown in FIG. 7 become unnecessary. Further, in step 100, the lookup table corresponding to the performance of the CPU specified in step 90 is referred.

In the third embodiment and the modification thereof described above, only the performance of the CPU is taken into account as a factor which governs the computing power of the executing environment. However, in place thereof or in addition thereto, other factors such as the capacity of the memory and the like may be taken into account.

For example, in the image taking device such as a digital camera, a limit of the computational amount point may be determined according to whether the photographing mode designated by the photographer is the high quality mode or the normal mode as shown in FIG. 11 and the computation may be performed to the limit.

Otherwise, a pair of pieces of data in the form of lookup tables such as shown in FIG. 12 in which the distinguishing condition is set versus the characteristic value may be prepared so that different data is read according to whether the photographing mode designated by the photographer is the high quality mode or the normal mode. The data may be set by the user so that processing desired by the user can be performed.

With the program in accordance with the third embodiment or the modification there of described above, in addition to effects similar to that obtained by the apparatus 10 of the first embodiment, a highest possible distinguishing accuracy can be realized by an optimal load within the computing power of the system. Further, in the case where the computing power of the executing environment is designated by the user, the user may designate a small computing power depending on the desired computing speed even if the executing environment actually has a larger computing power in order to increase the processing speed.

Further, a computer-readable medium on which a computer program in accordance with the third embodiment or the modification there of described above has been recorded is included in the present invention.

A fourth embodiment of the present invention will be described, hereinbelow. Though an apparatus for distinguishing an image of the underwater scene has been described in the first embodiment, a scene classifying apparatus which classifies the input image into the underwater scene, the night scene, the evening blow scene, and other scenes in a similar manner will be described in detail in this embodiment.

The scene classifying apparatus 11 comprises a specific scene image selecting apparatus 10 which selects the input image of a specific scene and a classifying portion 25 which classifies the input image according to the result of selection by the specific scene image selecting apparatus 10. Since being substantially the same as that described in the first embodiment, the specific scene image selecting apparatus 10 will not be described in detail here but only the difference therebetween will be described, hereinbelow.

Figure 13:
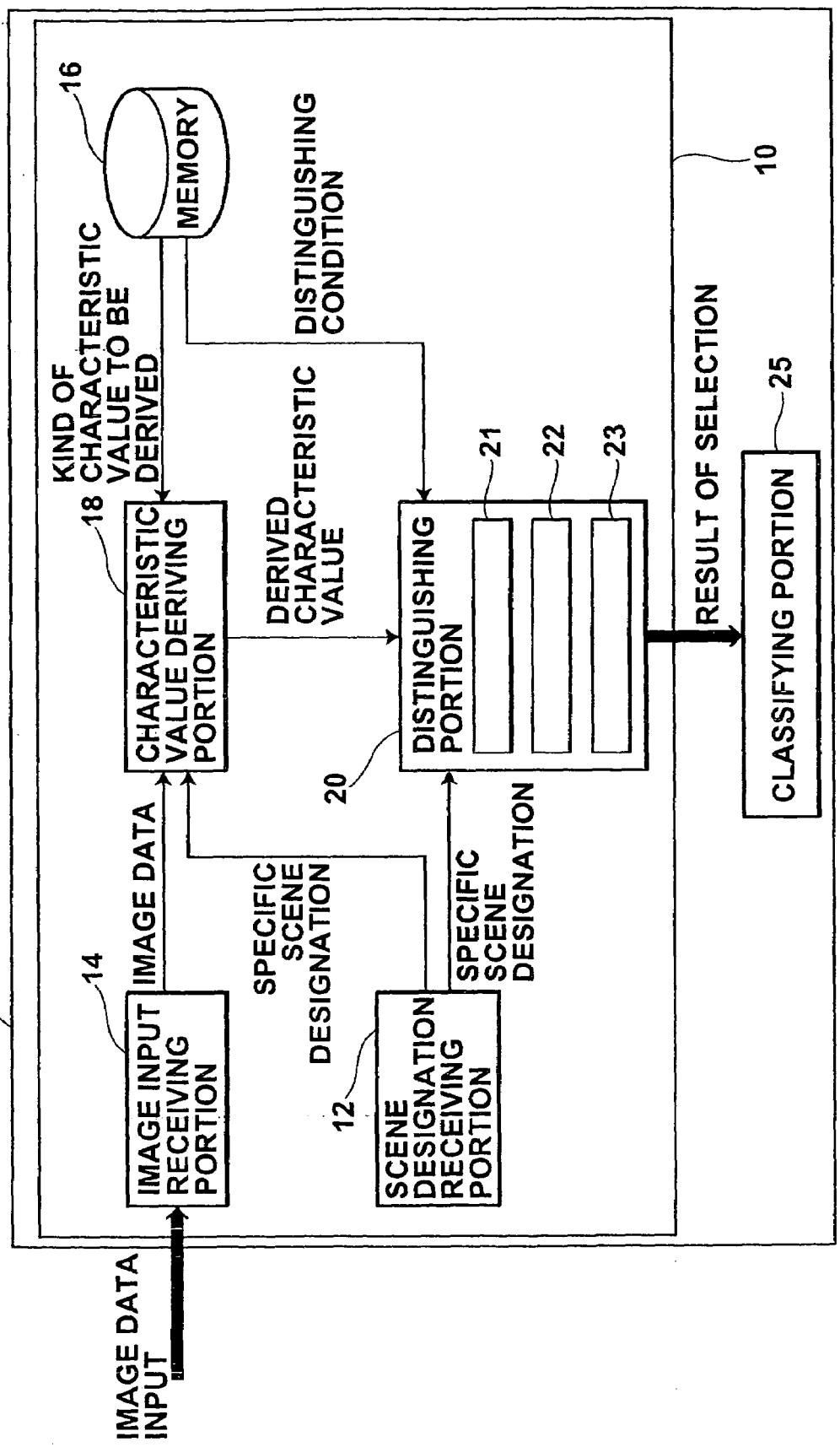
FIG. 13 is a block diagram showing the scene classifying device of the apparatus in accordance with a fourth embodiment of the present invention.

As shown in FIG. 13, the distinguishing portion 20 is provided with a distinguisher group (a plurality of distinguishers) 21 for distinguishment of the underwater scene, a distinguisher group 22 for distinguishment of the night scene and a distinguisher group 23 for distinguishment of the evening glow scene.

As described in the first embodiment, when distinguishing the underwater scene, a plurality of distinguishers (each corresponding to one characteristic value) are first prepared, and the characteristic values obtained from the sample images to be learned are input into the respective distinguishers, and the most effective distinguisher is selected from the distinguishers.

The weights on the sample images which the distinguisher has correctly distinguished as of the underwater scene are lightened while the weights on the sample images which the distinguisher has not correctly distinguished as of the underwater scene are increased and the sample images are input into the remaining distinguishers which have not been selected. Then those which are higher in the rate of correct answer are selected. The distinguisher is added by repeating these steps until the rate of correct answer exceeds a predetermined threshold value. (See FIG. 3.)

The distinguisher group 21 for distinguishment of the underwater scene is thus selected as a result of the learning. The distinguishing portion 20 distinguishes whether the input image data is for an image which is of the underwater scene by the use of the distinguisher group 21. When the image data to be distinguished is input, whether the input image data is for an image which is of the underwater scene is determined on the basis of the distinguishing points obtained by the respective distinguishers. For example, when the three characteristic values shown in FIG. 2 are used, the input image data is determined to be for an image which is of the underwater scene if the sum of the three distinguishing points derived from the input image data is positive while the input image data is determined not to be for an image which is of the underwater scene if the sum of the three distinguishing points derived from the input image data is negative.

As the night scene, the distinguisher which is most effective in distinguishment of the night scene is selected from the distinguishers according to the method shown in the flow chart of FIG. 3 by the use of image samples of the night scene and then the distinguisher is added by repeating the steps until the rate of correct answer exceeds a predetermined threshold value, thereby selecting the distinguisher group 22 for distinguishment of the night scene. Specifically, for example, four distinguishers (each corresponding to one of the characteristic values shown in the night scene in FIG. 2) are prepared. When distinguishing the night scene in the distinguishing portion 20, the four distinguishers selected as a result of the learning are used and the distinguishing points obtained from the respective distinguishers are summed.

Similarly, as the evening glow scene, the distinguisher group 23 for distinguishment of the evening glow scene is selected. Specifically, for example, four distinguishers (each corresponding to one of the characteristic values shown in the evening glow scene in FIG. 2) are prepared. When distinguishing the evening glow scene in the distinguishing portion 20, the distinguisher group 13 selected as a result of the learning is used and the distinguishing points obtained from the respective distinguishers are summed.

Figure 14:
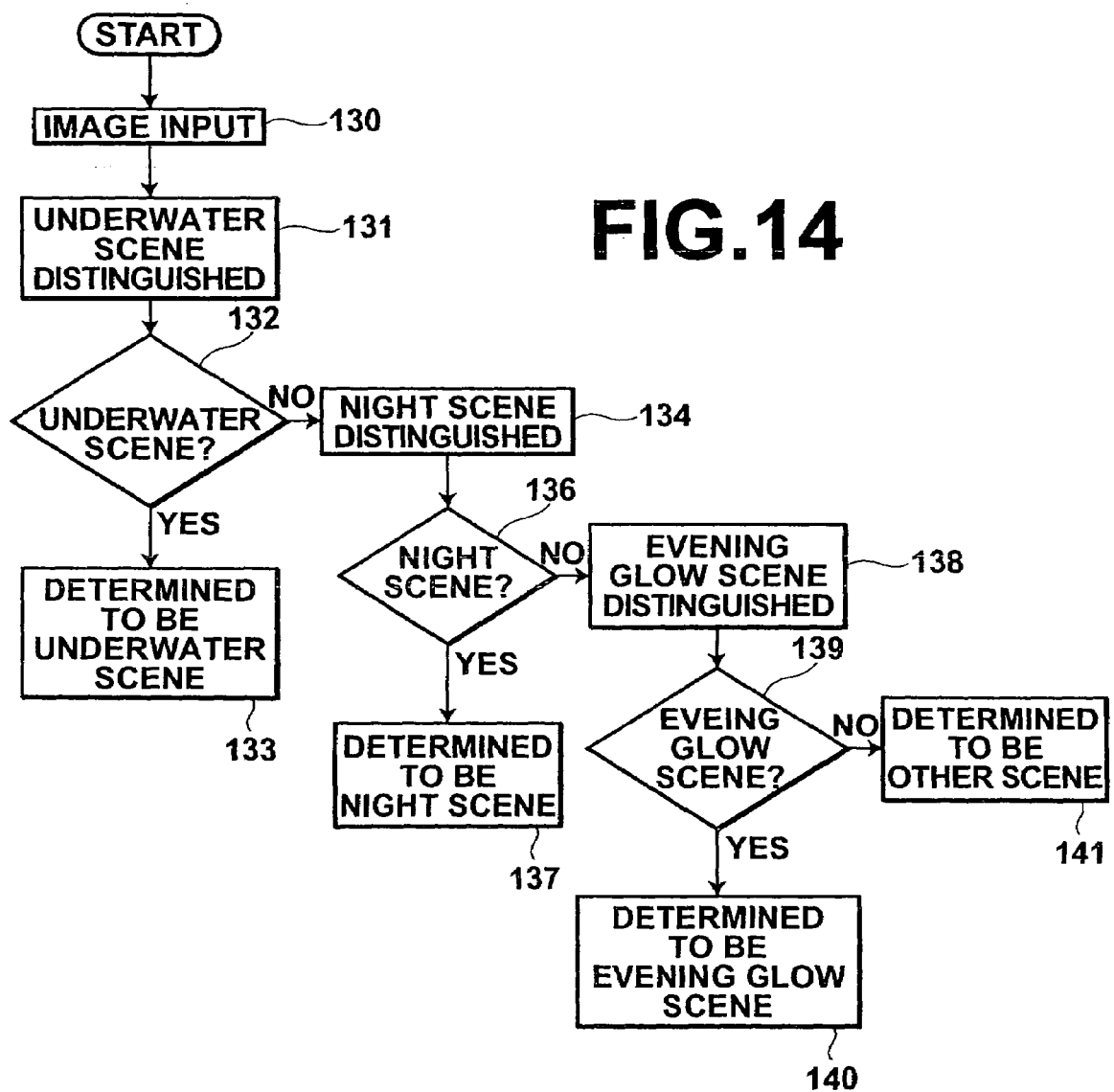
FIG. 14 is a flow chart for illustrating the flow of the processing which the program in accordance with the fourth embodiment of the present invention causes a computer to execute.

FIG. 14 is a flow chart representing an example of the flow of processing when the classifying portion 25 classifies the input image into the underwater scene, the night scene, the evening blow scene, and other scenes. The processing in each step will be described in detail, hereinbelow.

An image is first input through the image input receiving portion 14. (step 130) Then, the three characteristic values for distinguishment of the underwater scene, that is, the mean of the density B, the value of (the 80% point)−(20% point) of density B and the value of 70% point of color difference Cb (FIG. 2), are calculated from the input image by the use of the characteristic value deriving portion 18, and the distinguishing points are obtained from the respective distinguishers in the distinguisher group 21. (step 131) The distinguishing points are summed, and whether the input image is of the underwater scene is determined according to whether the sum is positive or negative.

When it is determined in step 132 that the sum is positive, it is determined in step 133 that the input image is of the underwater scene, while when it is determined in step 132 that the sum is negative, the processing proceeds to step 134. In step 134, it is determined whether the input image is of the night scene. That is, in step 134, the four characteristic values for distinguishment of the night scene, that is, the mean of brightness Y, the 70% point−30% point of color saturation, and the mean of the density B (FIG. 2), are calculated from the input image by the use of the characteristic value deriving portion 18, and the distinguishing points are obtained from the respective distinguishers in the distinguisher group 22 for distinguishment of the night scene. The distinguishing points are summed, and whether the input image is of the night scene is determined on the basis of the sum.

When it is determined in step 136 that the sum is positive, it is determined in step 137 that the input image is of the night scene, while when it is determined in step 136 that the sum is negative, the processing proceeds to step 138. In step 138, it is determined whether the input image is of the evening glow scene. That is, in step 138, the four characteristic values for distinguishment of the evening glow scene, that is, the 70% point of density R, the 90% point of brightness Y, the 90% point of density R, and the mean of color difference Cr (FIG. 2), are calculated from the input image by the use of the characteristic value deriving portion 18, and the distinguishing points are obtained from the respective distinguishers in the distinguisher group 23 for distinguishment of the evening glow scene. The distinguishing points are summed, and whether the input image is of the night scene is determined on the basis of the sum.

When it is determined in step 139 that the sum is positive, it is determined in step 140 that the input image is of the evening glow scene, while when it is determined in step 139 that the sum is negative, it is determined in step 141 that the input image is of the other scenes.

Though in the above embodiments, whether the input image is of the underwater scene, the night scene or the evening glow scene is determined in this order, it is preferred that whether the input image is of the underwater scene, the night scene or the evening glow scene be determined from the scene which the preceding input image is determined to be of when the current input image and the preceding input image are photographed at a short interval since in such a case probability that the images are of the same scene is strong. For example, when the preceding one of the two images which were photographed at a short interval is determined to be of the evening glow scene, the probability that the next image is of the evening glow scene is strong. Accordingly, in this case, by first carrying out the distinguishment on whether the input image is of the evening glow scene, the probability that the other distinguishments become unnecessary to increase the efficiency of the processing becomes strong.

Figure 15:
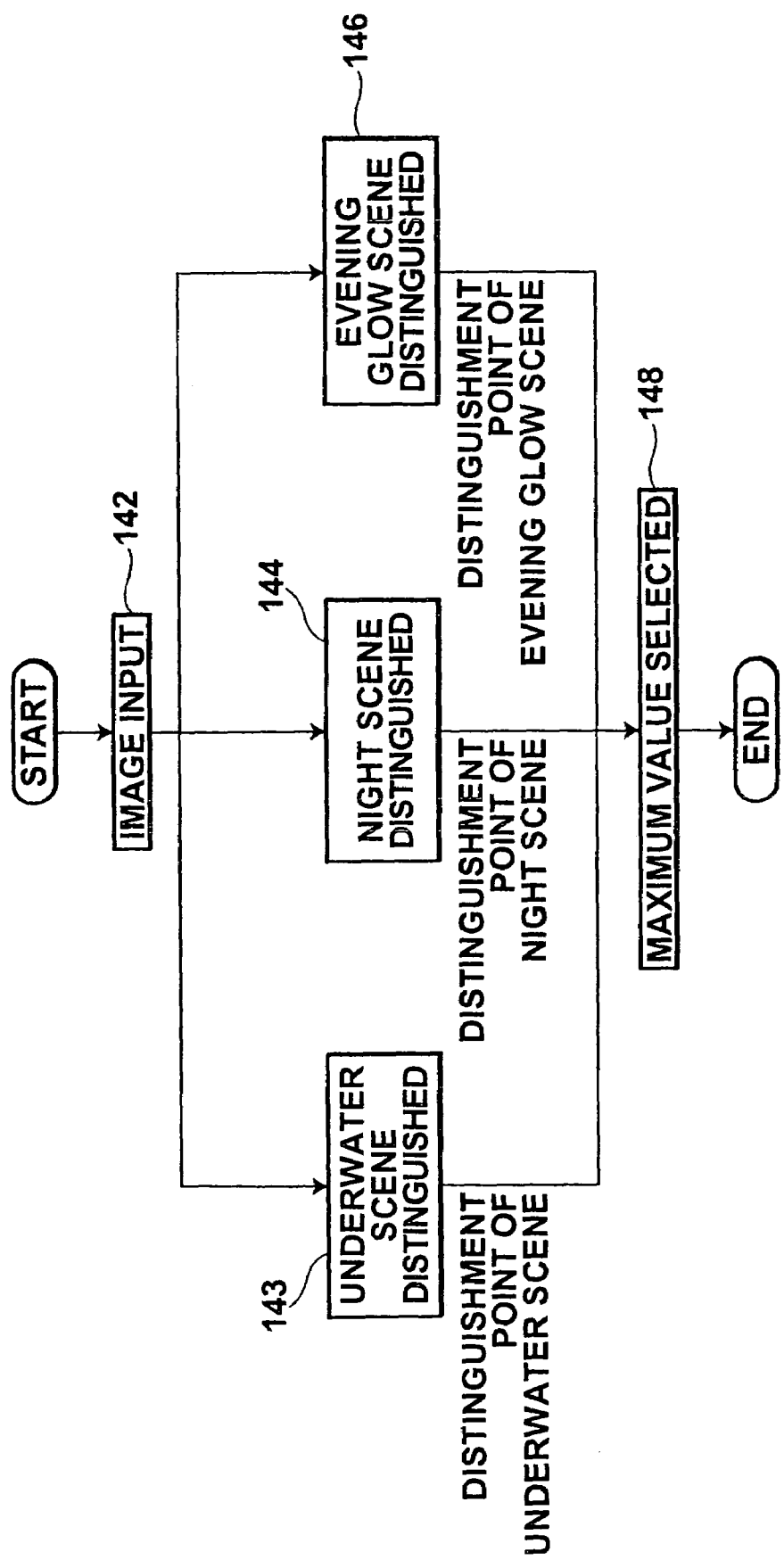
FIG. 15 is a view showing a modification the flow of the processing shown in FIG. 14.

Whether the input image is of the underwater scene, the night scene or the evening glow scene may be determined in parallel in the classifying portion 25 as shown in the flow chart shown in FIG. 15.

That is, an image is input in step 142, and the characteristic values calculated in the characteristic value deriving portion 18 are respectively input into the distinguisher groups 21, 22 and 23 in steps 143, 144 and 146. The input image is determined to be of the scene corresponding to the distinguisher group whose sum of the distinguishing points are the largest in the three distinguisher groups 21, 22 and 23 in step 148. However, when the largest sum of the distinguishing points is not larger than a predetermined threshold value, the input image is determined to be of the other scenes.

Though, being carried out by the method described in conjunction with first embodiment in this embodiment, the distinguishment may be carried out by any method. For example, a common mechanical learning known under the name of "clustering" or "boosting" may be used. Further, the characteristic values need not be described above but may be those empirically determined by a skilled engineer.

Further, this embodiment may be added with an arrangement for additional learning such as shown in the second embodiment.

A fifth embodiment of the present invention will be described, hereinbelow. In this embodiment, the apparatus comprising an image taking device such as a digital still camera or a cellular phone with a camera and an output device such as a monitor, a printer or instruments installed in a laboratory (including a server in a photo-bank) will be described. In the following embodiments, the elements analogous to those described above are given the same reference numerals and will not be described in detail.

Figure 16:
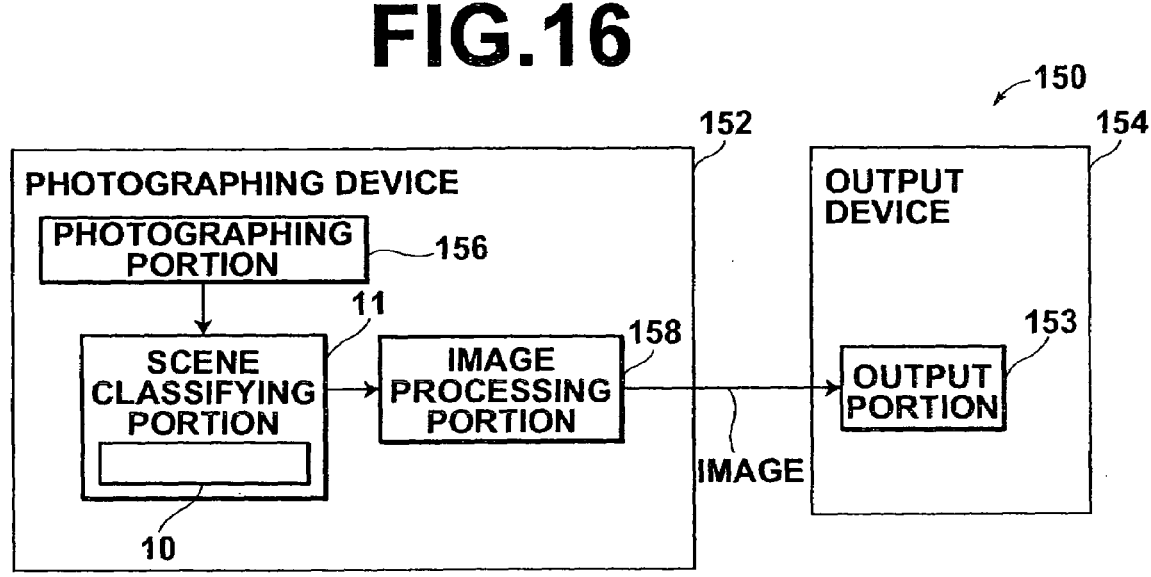
FIG. 16 is a block diagram showing the apparatus in accordance with a fifth embodiment of the present invention.

As shown in FIG. 16, the apparatus 150 of this embodiment comprises a photographing device 152 and an output device 154. The photographing device 152 is provided with an OS (operating system) such as Linux or a TRON and preferably can use a function provided by the OS such as the file managing function.

The photographing device 152 comprises a photographing portion 156 which obtains image data by photographing, a scene classifying portion 11 which classifies the image data obtained by the photographing portion 156, and an image processing portion 158 which carries out image processing on the image data according to the scene thereof.

The image processing portion 158 automatically carries out on the input image data image processing such as correction of the white balance or brightness adjustment according to the scene in which the image is classified by the scene classifying portion 11. Specifically, for example, when the white balance is to be corrected, the white balance of the normal image (the image classified as the other scenes when the image is to be classified into the underwater scene, the night scene, the evening blow scene, and other scenes) is corrected so that the image becomes gray as the whole by obtaining histograms of RGB, whereas the white balance of the image which has been determined to be of the underwater scene is not corrected since, in the case of the image of the underwater scene, the state where the white balance is out of balance and the density B is stronger is regular. In the case of a night scene image, it is regular that the image is dark as the whole, and accordingly, the image processing of brightness adjustment is not carried out when the input image has been classified as of the night scene.

The output device 154 receives the processed image data by way of a network or reads the image data once stored in a recording medium by the photographing device 152, and displays the image on the monitor of the output portion 153, prints the image or stores the image in a memory such as a photo-bank in a laboratory.

Figure 17:
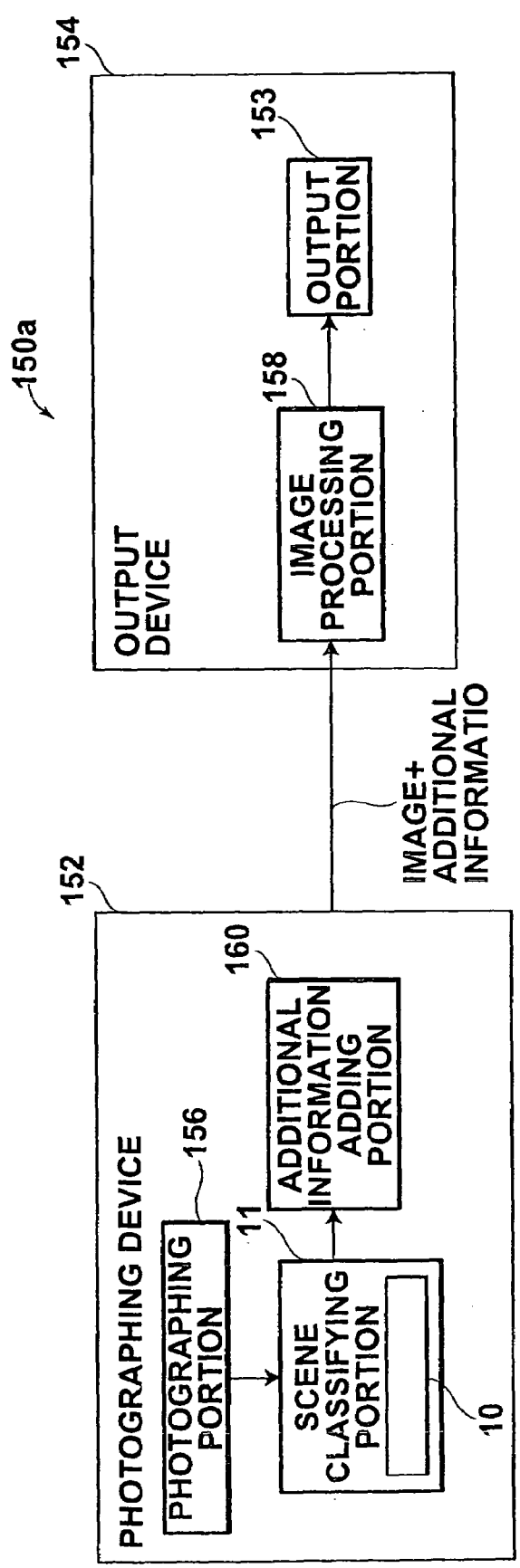
FIG. 17 is a block diagram showing a modification of the apparatus in accordance with the fifth embodiment of the present invention.

Otherwise, the image processing portion 158 may be provided in the output device 154 in place of the photographing device 152 as in the apparatus 150a shown in FIG. 17. In this case, the scene information obtained by the scene classifying portion 11 may be added to the image data as additional information (e.g., tag information in Exif) in an additional information adding portion 160 and the image data added with the additional information may be delivered to the output device 154. By thus providing the image processing portion 158, image processing can be carried out according to the characteristics of the output device 154.

A sixth embodiment of the present invention will be described, hereinbelow. In this embodiment, the apparatus comprising an image taking device such as a digital still camera or a cellular phone with a camera, an image processing device such as a personal computer and an output device such as a monitor, a printer or instruments installed in a laboratory (including a server in a photo-bank) will be described.

Figure 18:
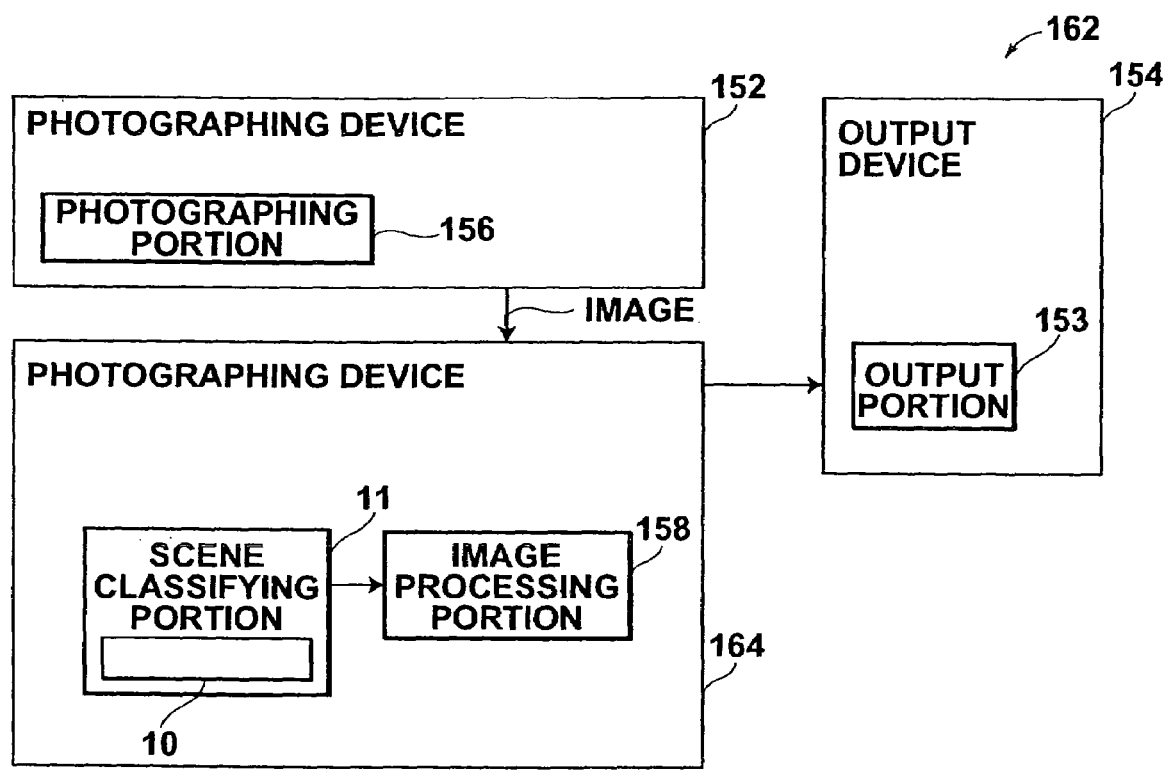
FIG. 18 is a block diagram showing the apparatus in accordance with a sixth embodiment of the present invention.

As shown in FIG. 18, the apparatus 162 of this embodiment comprises the photographing device 152, an image processing device 164 and the output device 154.

The photographing device 152 comprises a photographing portion 156 which obtains image data by photographing, and the image processing device 164 comprises the scene classifying portion 11 which classifies the image data and the image processing portion 158 which carries out image processing on the image data according to the scene thereof.

The image processing device 164 receives image data by way of a network from the photographing device 152 or reads image data once stored in a recording medium by the photographing device 152 and delivers the image data to the scene classifying portion 11. The image processing portion 158 carries out image processing on the image data according to the scene thereof.

Further, the image data processed by the image processing portion 158 is sent to the output device 154 by way of a network or a recording medium, and the output device 154 displays the processed image data on the monitor, prints the processed image data or stores the processed image data in a memory such as a photo-bank installed in a laboratory.

Figure 19:
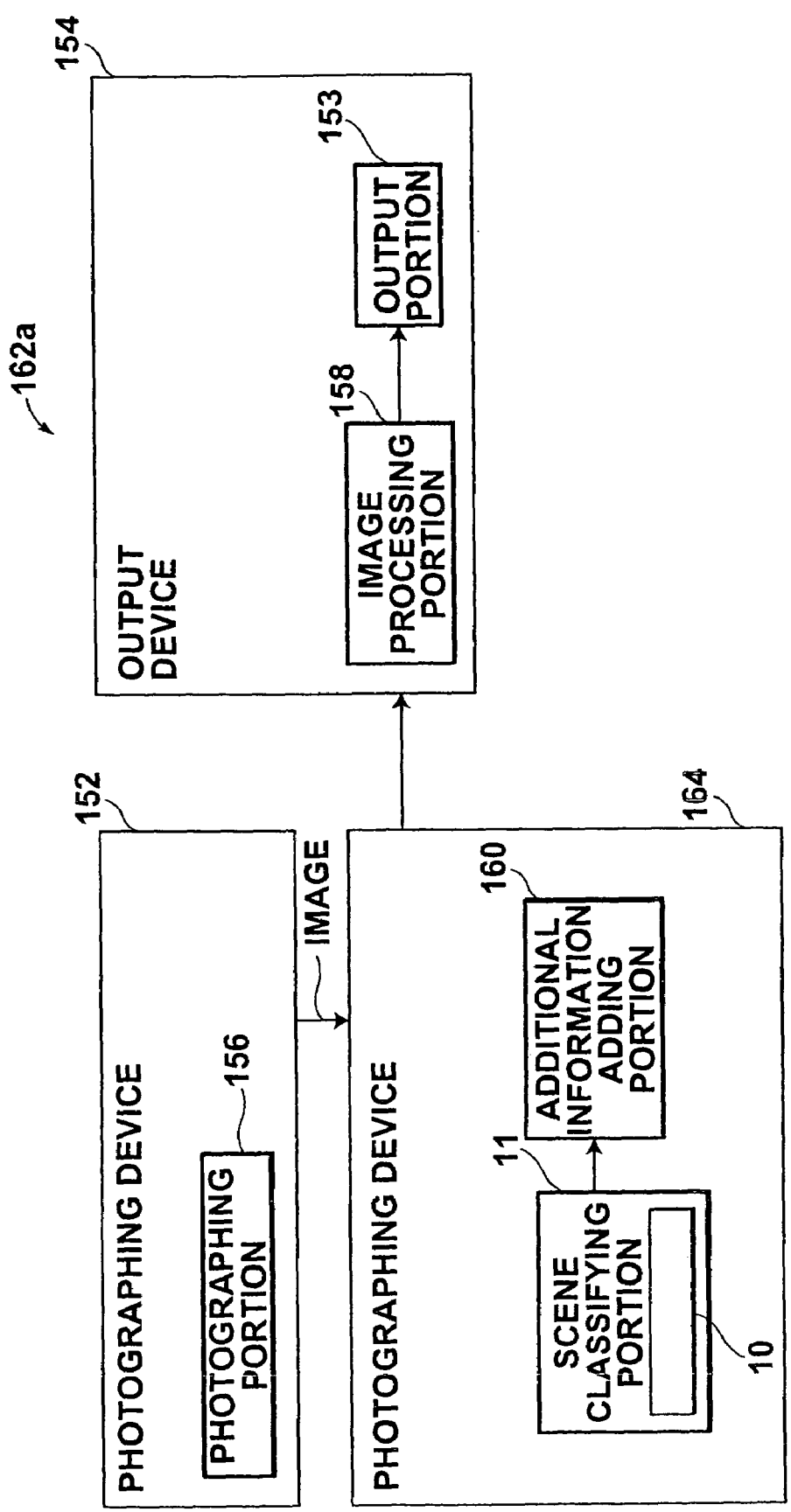
FIGS. 19 and 20 are block diagrams showing a modification of the apparatus in accordance with the sixth embodiment of the present invention.

Otherwise, the image processing portion 158 may be provided in the output device 154 in place of the image processing device 164 as in the apparatus 162*a* shown in FIG. 19. In this case, the scene information obtained by the scene classifying portion 11 may be added to the image data as additional information (e.g., tag information in Exif) in the additional information adding portion 160 and the image data added with the additional information may be delivered to the output device 154. By thus providing the image processing portion 158, image processing can be carried out according to the characteristics of the output device 154.

Figure 20:
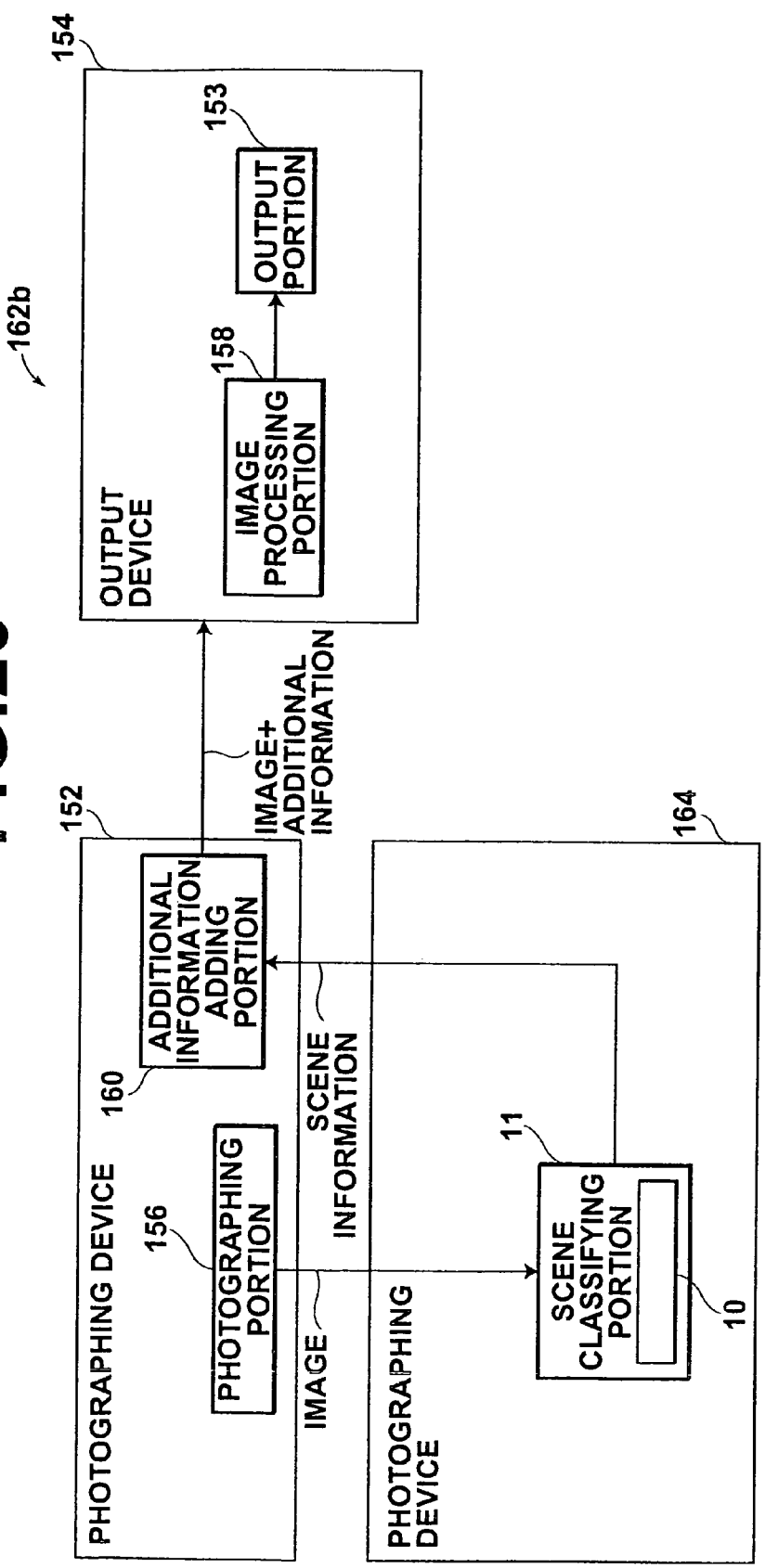

Further, as in the apparatus 162*b* shown in FIG. 20, the image processing device 164 may comprise only the scene classifying portion 11 and classify the image data, which, for instance, has received from the photographing device 152 by way of a network so that the image processing device 164 transfers only the scene information thereby obtained again to the photographing device 152 by way of the network.

A seventh embodiment of the present invention will be described, hereinbelow. In this embodiment, the apparatus comprising an image taking device such as a digital still camera or a cellular phone with a camera and an output device such as a monitor, a printer or instruments installed in a laboratory (including a server in a photo-bank) will be described. In this embodiment, the output device has a function of the scene classification.

Figure 21:
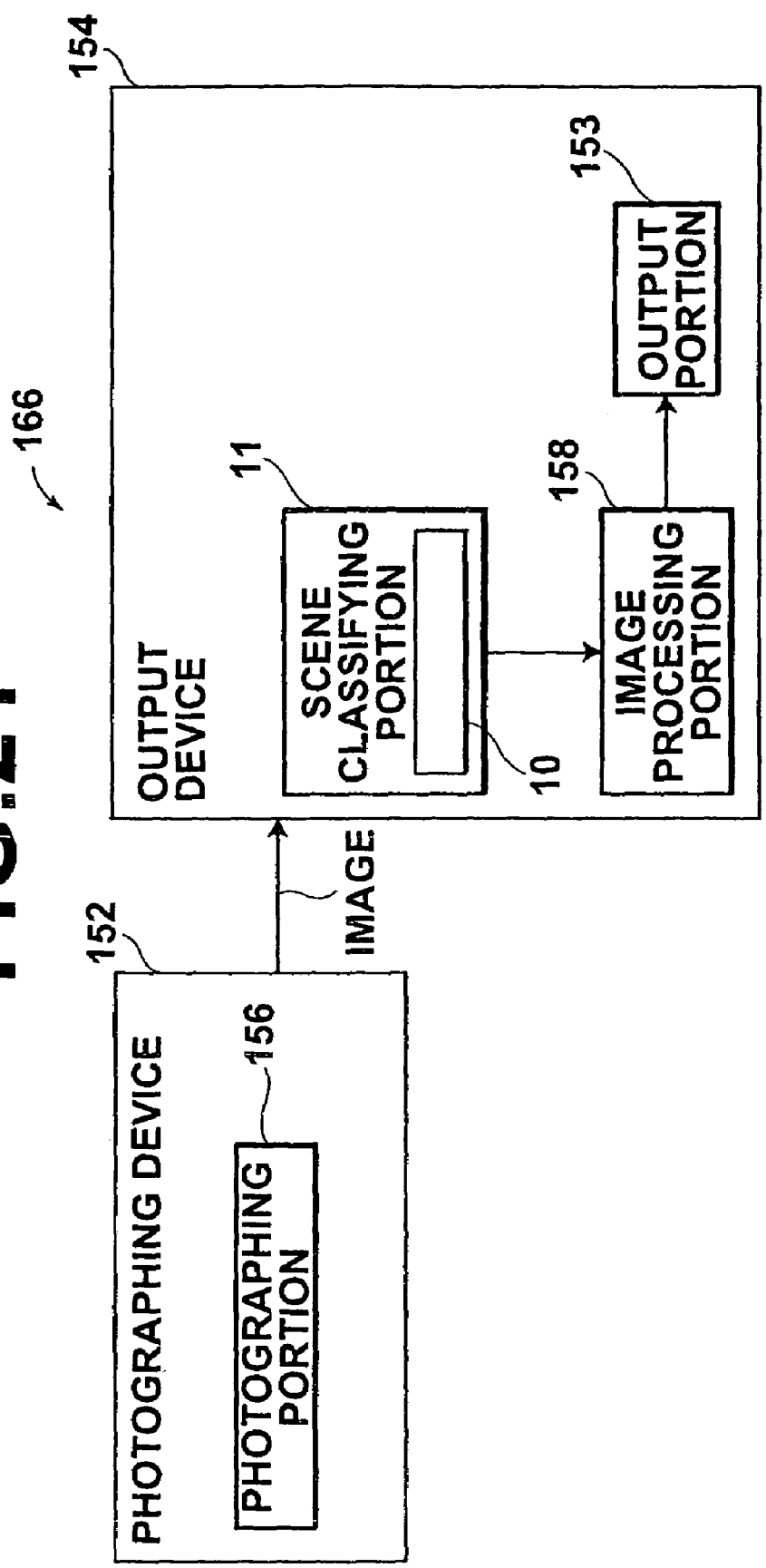
FIG. 21 is a block diagram showing the apparatus in accordance with a seventh embodiment of the present invention.

As shown in FIG. 21, the photographing device 152 of the apparatus 166 of this embodiment comprises only the photographing portion 154, and the scene classifying portion 11 and the image processing portion 158 are provided in the output device 154.

The output device 154 receives the image data from the photographing device 152 by way of a network or a recording medium, and causes the scene classifying portion 11 to classify the image data and the image processing portion 158 to carry out image processing on the image data according to the scene thereof.

In the fifth to seventh embodiments, the scene classifying portion is provided in the photographing device, the image processing device or the output device. The classified image data may be stored in different holders depending on the scenes in a memory (e.g., such as a server or a recording medium in a photo-bank) provided in the photographing device, the image processing device or the output device. Further, when the image data is stored in different holders in the output device (e.g., such as a server computer in a photo-bank provided in a laboratory), the index print may be made for each holder.

Further as described above in conjunction with the third embodiment, the kinds of the characteristic values which the distinguisher uses depending on the operating power of the program executing environment and/or the desired processing speed and/or the number of the characteristic values which are used for distinguishment of the scene in the apparatus 10 may be changed depending on in which device the apparatus 10 for distinguishing the image of the specific scene is provided.

An eighth embodiment of the present invention will be described, hereinbelow. In this embodiment, the image taking device such as a digital still camera or a cellular phone with a camera has a function of the scene classification and the function of the scene classification is interlocked with the photographing mode set in the image taking device.

Figure 22:
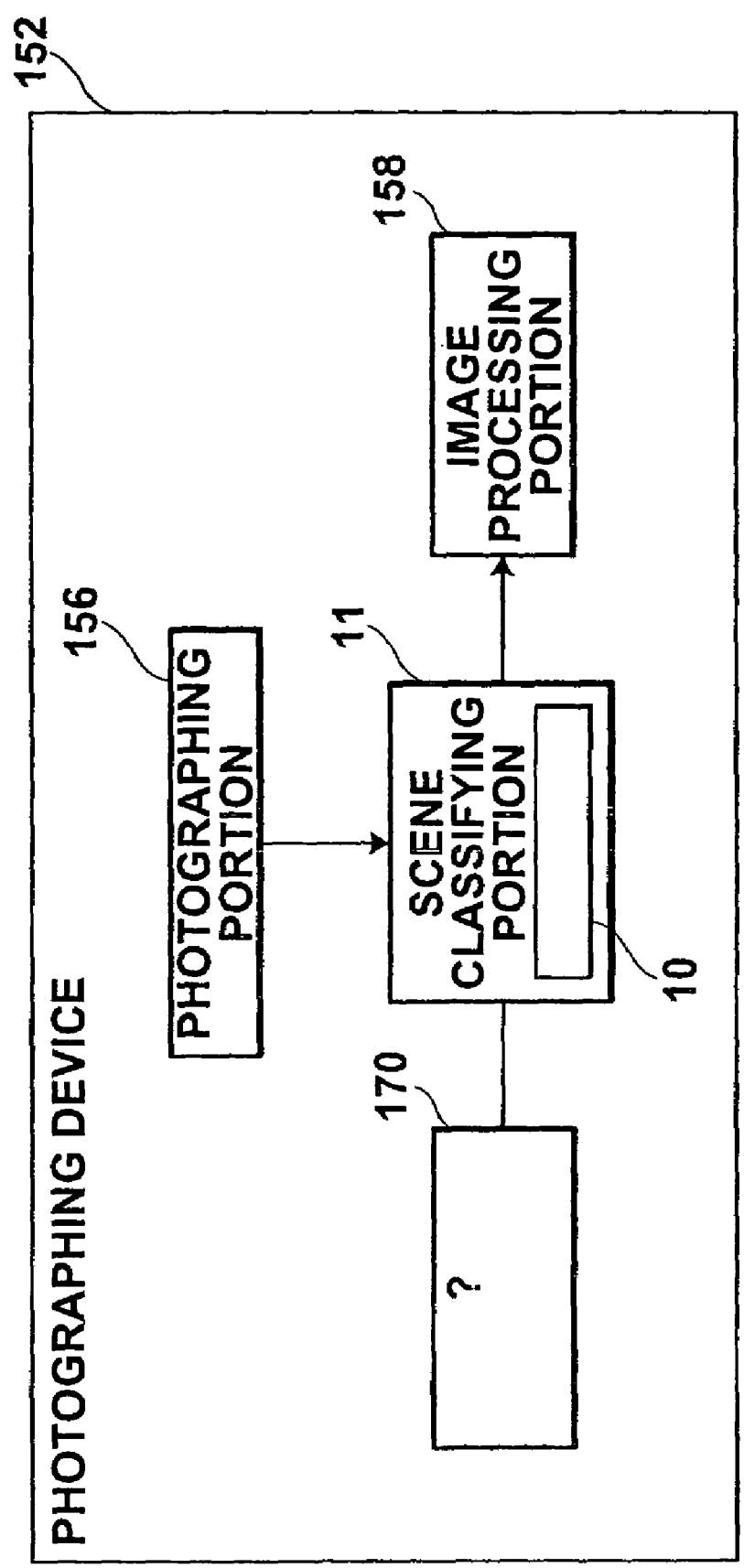
FIG. 22 is a block diagram showing the apparatus in accordance with an eighth embodiment of the present invention.

As shown in FIG. 22, the photographing device 152 comprises a photographing portion 156 which obtains image data by photographing, a scene classifying portion 11 which classifies the image data obtained by the photographing portion 156, an image processing portion 158 which carries out image processing on the image data according to the scene thereof, and a scene specifying information obtaining means 170 which obtains information for specifying the scene such as the photographing mode upon taking the image.

The photographing device 152 such as a digital still camera sometimes has a function of designating the photographing mode such as a night scene mode or an evening glow scene mode and when the photographer designates a photographing mode taking into account the environmental conditions upon photographing, photographing is performed according to the designated photographing mode.

The scene specifying information obtaining means 170 obtains the photographing mode as the information for specifying the scene, and the scene classifying portion 11 determines whether the image obtained by the photographing is of the scene designated by the photographing mode.

Figure 23:
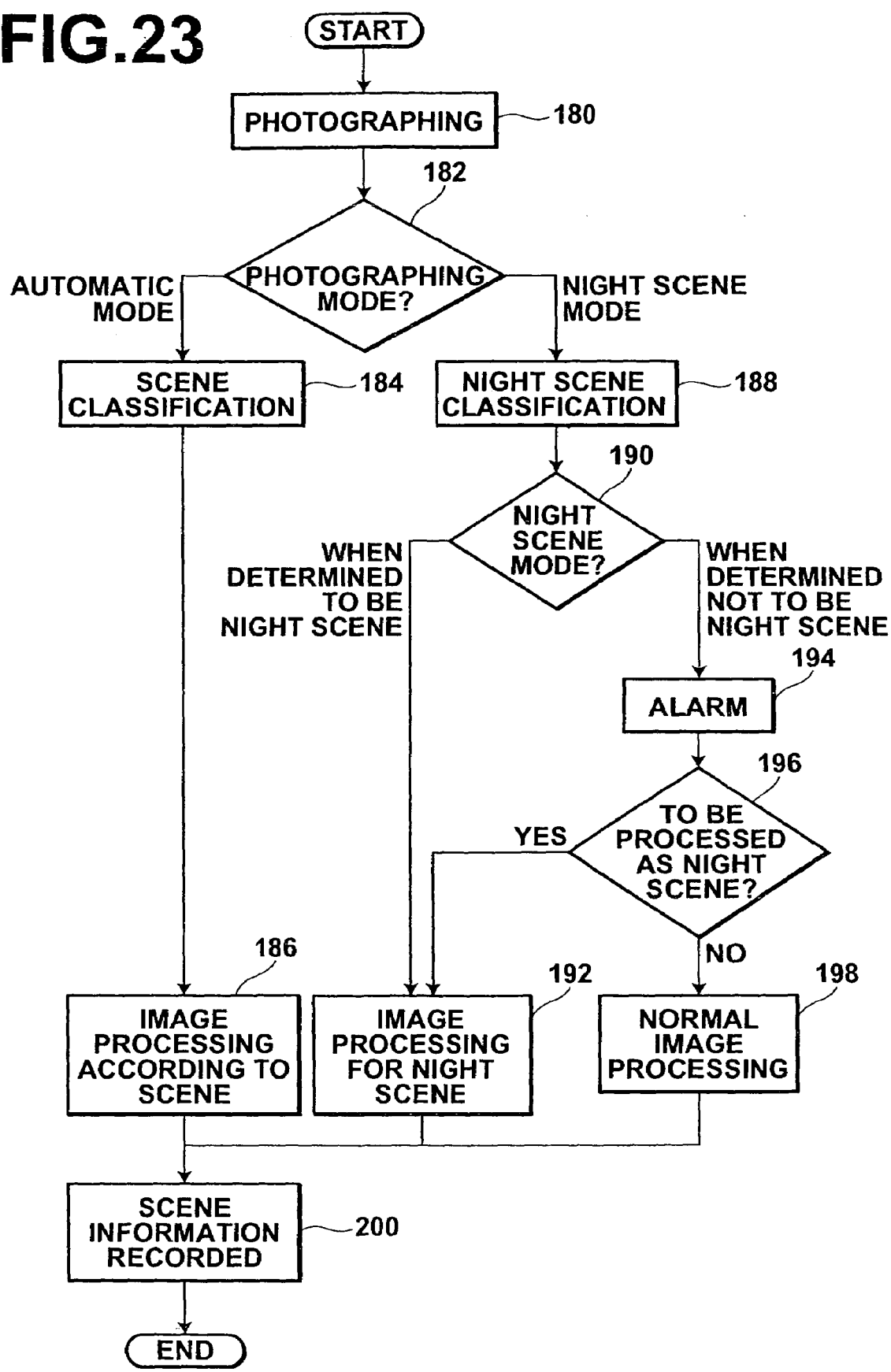
FIG. 23 is a flow chart for illustrating the flow of the processing which the photographing device of the apparatus in accordance with the eighth embodiment of the present invention executes.

FIG. 23 is a flow chart for illustrating operation of the photographing device of this embodiment.

In step 182, it is determined whether the photographing mode the photographer selected when the photographing portion 156 obtained the image data. When it is determined in step 182 that the photographing mode the photographer selected when the photographing portion 156 obtained the image data is the automatic mode, and the image processing portion 158 carries out the image processing on the image data according to the scene as which the image data is classified (step 186).

Whereas, when it is determined in step 182 that the photographing mode the photographer selected when the photographing portion 156 obtained the image data is the night scene mode, the scene classifying portion 11 classifies the image data (step 188). When it is determined in step 190 that the image data is of the night scene, the image processing portion 158 carries out the image processing on the image data according to the night scene (step 192). When it is determined in step 190 that the image data is not of the night scene, an alarm message to the effect that "Is the image processing to be carried out according to the night mode?" is displayed, e.g., on the LCD display of the digital still camera to prompt the photographer to confirm the photographing mode. (step 194).

When the photographer instructs in step 196 to process the image data as the night scene, the image processing portion 158 carries out the image processing on the image data according to the night scene (step 192). Whereas when the photographer instructs in step 196 not to process the image data as the night scene, the image processing portion 158 carries out the normal image processing on the image data.

Further, the scene information (e.g., tag information in Exif) is recorded on a recording medium or the memory of the photographing device in addition to the image data according to the scene determined. (step 200).

The classifying portion 11 either may classify the input image into the underwater scene, the night scene, the evening blow scene, and other scenes or may determine only whether the image data is of the night scene.

Though, in the embodiment described above, whether the actual photographed image conforms to the set photographing mode is determined, information such the photographing time or whether the strobe light was used may be obtained in the scene specifying information obtaining means 170 as the information for specifying the scene in addition to the photographing mode.

For example, when the clock built in the photographing device shows that the image is photographed in the night, there is a strong probability that the image is of the night scene but there is a weak probability that the image is of a blue sky scene which was photographed in the fine outdoors. Accordingly, when the clock built in the photographing device shows that the image is photographed in the night, the threshold value for determining that the image is of the night scene may be reduced and/or the distinguishing points for the night scene may be increased so that the image becomes more apt to be determined to be of the night scene. Further, when there is a strong probability that the image is of the night scene but there is hardly a probability that the image is of the fine weather scene, the distinguishment whether the image is of the fine weather scene may be skipped.

Further, when the image was photographed with the strobe light on, there is a weak probability that image is of the fine weather scene, and accordingly, the distinguishment whether the image is of the fine weather scene may be skipped.

Further, when the camera is provided with a clock, a sensor for detecting the photographing direction and a position sensor like a GPS for detecting the photographing position, the relation between the position of the camera and the position of the sun upon photographing can be known from the photographing time, the photographing direction and the photographing position, and accordingly, when the image was photographed in daylight toward the sun, the image can be of a backlight scene. These information may be obtained as the information for specifying the scene and the scene may be distinguished according to the scene when the image is taken.

By thus obtaining information for specifying the scene, the distinguishing accuracy can be increased.

Further, by adding the information for specifying the scene obtained by the photographing device to the image as the additional information, the distinguishing accuracy can be increased by referring to the information.

Though the above description has been made on natural images obtained by photographing, the apparatus of the embodiments described above can be applied to distinguish an artificial image created by computer graphics or the like and a natural image from each other by changing the characteristic value.

What is claimed is:

1. A specific scene image selecting apparatus comprising
    a scene designation receiving means which receives designation of a desired specific scene of a plurality of scenes,
    an image input receiving means which receives input of image data representing an object image to be selected,
    a characteristic value deriving means which derives from the image data input into the image input receiving means at least one of a characteristic value for use in distinguishment of the specific scene and characteristic values for use in distinguishment of the plurality of scenes, referring to reference data in which the kind of at least one characteristic value for use in distinguishment of the specific scene and distinguishing condition corresponding to at least one characteristic value are defined in advance for each of the plurality of scenes which can be designated as the specific scene, and
    a distinguishing means which determines whether the image data is data representing an image which is of the specific scene input into the scene designation receiving means on the basis of the characteristic value derived by the characteristic value deriving means referring to the corresponding distinguishing condition defined in the reference data.

2. A specific scene image selecting apparatus as defined in claim 1 further comprising a correct answer receiving means which receives correct designation of a scene which the image data of an image which has not been correctly distinguished by the distinguisher indicates, and an additional learning means which updates the reference data by learning the image data of the scene the correct designation of which has been received.

3. The specific scene image selecting apparatus according to claim 1, further comprising:
    a classifying portion that classifies the input image data into a scene type;
    wherein the scene type is at least one of an underwater scene, a night scene and an evening blow scene.

4. A specific scene image selecting apparatus comprising:
    a scene designation receiving means which receives designation of a desired specific scene,
    an image input receiving means which receives input of image data representing an object image to be selected,
    a characteristic value deriving means which derives from the image data input into the image input receiving means at least one characteristic value for use in distinguishment of the specific scene referring to reference data in which the kind of at least one characteristic value for use in distinguishment of the specific scene and distinguishing condition corresponding to at least one characteristic value are defined in advance for each of the plurality of scenes which can be designated as the specific scene, and
    a distinguishing means which determines whether the image data is data representing an image which is of the specific scene input into the scene designation receiving means on the basis of the characteristic value derived by the characteristic value deriving means referring to the corresponding distinguishing condition defined in the reference data,
    wherein the reference data is determined by learning for each of the scenes which can be designated as the specific scene in advance a weighted sample image group consisting of a plurality of images which have been known to be of the scene and a plurality of images which have been known not to be of the scene, and
    the learning of the plurality of scenes comprises:
    the setting step of setting the initial values of the weights on the respective images forming the weighted sample image group,
    the selecting step of selecting a distinguisher, which is the most effective to distinguish scenes to be currently learned and scenes not to be currently learned, out of the distinguishers corresponding to the respective characteristic values which are used for distinguishment of the scenes,
    the updating step of updating the weights of the respective images of the weighted sample image group so that the weights of the images not correctly distinguished by the distinguisher which is selected by the preceding selecting step is larger than the current weights of the images and/or the weights of the images correctly distinguished by the distinguisher which is selected by the preceding selecting step is smaller than the current weights of the images,
    the repeating step of repeating the selecting step and the updating step until the rate of correct answers of the combination of the selected distinguishers exceeds a predetermined reference value, and the determining step of determining the kind of at least one characteristic value for use in distinguishment of the scene to be currently learned and the distinguishing condition on the basis of the selected distinguisher.

5. A specific scene image selecting apparatus as defined in claim 4 in which the distinguishers corresponding to the respective characteristic values comprise a histogram which represents the ratio or the difference between the respective frequencies of the characteristic value corresponding to the distinguisher which are exhibited by the images to be currently learned and those of the characteristic value corresponding to the distinguisher which are exhibited by the images not to be currently learned.

6. An image taking device comprising
an image taking means which obtains image data representing an object taken,
a scene designation receiving means which receives designation of a desired specific scene,
a characteristic value deriving means which derives from the image data at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and
a distinguishing means which determines whether the image data is data representing an image which is of the specific scene input into the scene designation receiving means on the basis of the characteristic value derived by the characteristic value deriving means referring to the corresponding distinguishing condition defined in the reference data.

7. An image taking device as defined by claim 6 further comprising
a scene specifying information obtaining means which obtains information for specifying the scene upon taking the image, and the scene designation receiving means receives designation of a desired specific scene on the basis of the information for specifying the scene obtained by the scene specifying information obtaining means.

8. The image taking device as defined by claim 6, further comprising:
an image processing section that corrects for at least one of white balance and brightness adjustment according to the specific scene when the distinguishing means determines that the image data is of the specific scene.

9. The image taking device as defined by claim 6, wherein the desired specific scene is designated to correspond to a photographing mode of the image taking means.

10. A computer program for causing a computer to function as
a scene designation receiving means which receives designation of a desired specific scene,
an image input receiving means which receives input of image data representing an object image to be selected,
a characteristic value deriving means which derives from the image data input into the image input receiving means at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene, and
a distinguishing means which determines whether the image data is data representing an image which is of the specific image input into the scene designation receiving means on the basis of the characteristic value derived by the characteristic value deriving means referring to the corresponding distinguishing condition defined in the reference data.

11. A computer program as defined in claim 10 in which the kinds and/or the number of the characteristic values are changed depending on the operating power of the program executing environment and/or the desired processing speed.

12. A computer readable medium on which is recorded a computer program for causing a computer to function as
a scene designation receiving means which receives designation of a desired specific scene,
an image input receiving means which receives input of image data representing an object image to be selected,
a characteristic value deriving means which derives from the image data input into the image input receiving means at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene, and
a distinguishing means which determines whether the image data is data representing an image which is of the specific image input into the scene designation receiving means on the basis of the characteristic value derived by the characteristic value deriving means referring to the corresponding distinguishing condition defined in the reference data.

13. A computer readable medium as defined in claim 12 in which the kinds and/or the number of the characteristic values are changed depending on the operating power of the program executing environment and/or the desired processing speed.

14. A specific scene image selecting method comprising
a scene designation receiving step of receiving designation of a desired specific scene,
an image input receiving step of receiving input of image data representing an object image to be selected,
a characteristic value deriving step of deriving from the image data at least one characteristic value for use in distinguishment of the specific scene referring to reference data in which the kind of at least one characteristic value for use in distinguishment of the specific scene and distinguishing condition corresponding to at least one characteristic value are defined in advance by the scenes which can be designated as the specific scene and
a distinguishing step of determining whether the image data is data representing an image which is of the specific scene designated in the scene designation receiving step on the basis of the characteristic value derived in the characteristic value deriving step referring to the corresponding distinguishing condition defined in the reference data.

\* \* \* \* \*